(12) United States Patent
Forutanpour et al.

(10) Patent No.: US 12,033,454 B2
(45) Date of Patent: Jul. 9, 2024

(54) KIOSK FOR EVALUATING AND PURCHASING USED ELECTRONIC DEVICES

(71) Applicant: ecoATM, LLC, San Diego, CA (US)

(72) Inventors: Babak Forutanpour, San Diego, CA (US); Ted Ray Gooding, San Diego, CA (US); Robert O'Neill, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 93 days.

(21) Appl. No.: 17/445,158

(22) Filed: Aug. 16, 2021

(65) Prior Publication Data

US 2022/0051507 A1 Feb. 17, 2022

Related U.S. Application Data

(60) Provisional application No. 63/116,020, filed on Nov. 19, 2020, provisional application No. 63/116,007, (Continued)

(51) Int. Cl.
*G07F 11/00* (2006.01)
*G06Q 10/30* (2023.01)
(Continued)

(52) U.S. Cl.
CPC ........... *G07F 11/005* (2013.01); *G06Q 10/30* (2013.01); *G06Q 20/18* (2013.01); *G07F 9/001* (2020.05);
(Continued)

(58) Field of Classification Search
CPC ......... H04M 1/0287; H04M 1/24; G07F 7/06; G06Q 20/18
See application file for complete search history.

(56) References Cited

U.S. PATENT DOCUMENTS 1,327,315 A * 1/1920 Davies .................... B21B 39/26
414/754
3,808,439 A 4/1974 Renius
(Continued)

FOREIGN PATENT DOCUMENTS

CA 2760863 11/2010
CA 2818533 A1 5/2012
(Continued)

OTHER PUBLICATIONS

2006 Florida Statutes Title XXXIII, Chapter 538, Sections 538.03 and 538.04, 7 pages.
(Continued)

*Primary Examiner* — Timothy R Waggoner
(74) *Attorney, Agent, or Firm* — Perkins Coie LLP

(57) ABSTRACT

Various embodiments of kiosks for purchasing mobile phones and other mobile electronic devices from users are disclosed herein. In some embodiments, the kiosks include an apparatus to turn a mobile phone over on an inspection surface. This apparatus can enable the kiosk to visually inspect both the front and back sides of the mobile device on the inspection surface with an inspection system (e.g., imaging devices, lighting devices, etc.) positioned above the inspection surface, and can eliminate the need to position a second inspection system below a transparent inspection surface to visually inspect, e.g., the back side of the mobile device through the transparent inspection surface. In some embodiments, the kiosk also includes a wireless mobile phone charging device that can be used for, e.g., phone charging and identification.

38 Claims, 13 Drawing Sheets

Related U.S. Application Data filed on Nov. 19, 2020, provisional application No. 63/066,794, filed on Aug. 17, 2020.

(51) Int. Cl.

| | | |
|---|---|---|
| *G06Q 20/18* | (2012.01) | |
| *G07F 9/00* | (2006.01) | |
| *G07F 9/02* | (2006.01) | |
| *G07F 17/00* | (2006.01) | |
| *H04B 1/3877* | (2015.01) | |
| *H02J 7/02* | (2016.01) | |
| *H02J 50/80* | (2016.01) | |

(52) U.S. Cl.
CPC ............ *G07F 9/002* (2020.05); *G07F 9/0235* (2020.05); *G07F 17/0014* (2013.01); *H04B 1/3877* (2013.01); *H02J 7/02* (2013.01); *H02J 50/80* (2016.02)

(56) References Cited

U.S. PATENT DOCUMENTS

| | | |
|---|---|---|
| 4,248,334 A | 2/1981 | Hanley et al. |
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,159,560 A | 10/1992 | Newell et al. |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,413,454 A | 5/1995 | Movesian |
| 5,419,438 A | 5/1995 | Squyres et al. |
| 5,436,554 A | 7/1995 | Decker |
| 5,482,140 A * | 1/1996 | Moore .................. B65G 47/252 198/402 |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,407,392 B1 | 8/2008 | Cooke et al. |
| 7,408,674 B2 | 8/2008 | Moro et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B2 | 3/2013 | Kim |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,743,215 B1 | 11/2014 | Lee |
| 8,922,643 B2 | 12/2014 | Ji et al. |
| 9,010,627 B1 | 4/2015 | Prasad et al. |
| 9,043,026 B2 | 5/2015 | Lien et al. |

(56) References Cited

U.S. PATENT DOCUMENTS

| | | |
|---|---|---|
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,317,989 B2 | 4/2016 | Grow et al. |
| 9,355,515 B2 | 5/2016 | Brahami et al. |
| 9,367,982 B2 | 6/2016 | Chayun et al. |
| 9,378,606 B2 | 6/2016 | Chayun et al. |
| 9,390,442 B2 | 7/2016 | Lyle |
| 9,497,563 B2 | 11/2016 | Hornung et al. |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,668,298 B1 | 5/2017 | Pearl et al. |
| 9,697,548 B1 | 7/2017 | Jaff et al. |
| 9,704,142 B2 | 7/2017 | Ahn |
| 9,818,160 B2 | 11/2017 | Bowles et al. |
| 9,866,664 B2 | 1/2018 | Sinha et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 10,032,140 B2 | 7/2018 | Bowles et al. |
| 10,043,339 B2 | 8/2018 | Walker et al. |
| 10,044,843 B2 | 8/2018 | Sinha et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,269,110 B2 | 4/2019 | Forutanpour et al. |
| 10,275,813 B2 | 4/2019 | Fu |
| 10,325,440 B2 | 6/2019 | Abdelmalak et al. |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,475,002 B2 | 11/2019 | Silva et al. |
| 10,496,963 B2 | 12/2019 | Silva et al. |
| 10,572,946 B2 | 2/2020 | Bowles et al. |
| 10,679,279 B2 | 6/2020 | Ward |
| 10,740,891 B1 | 8/2020 | Chen et al. |
| 10,803,527 B1 | 10/2020 | Zankat et al. |
| 10,824,942 B1 | 11/2020 | Bhotika et al. |
| 10,825,082 B2 | 11/2020 | Librizzi et al. |
| 10,846,672 B2 | 11/2020 | Dion et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 10,970,786 B1 | 4/2021 | Matheson et al. |
| 10,977,700 B2 | 4/2021 | Bordeleau et al. |
| 11,010,841 B2 | 5/2021 | Bowles et al. |
| 11,024,111 B2 | 6/2021 | Abdelmalak et al. |
| 11,080,662 B2 | 8/2021 | Bowles et al. |
| 11,080,672 B2 | 8/2021 | Bowles |
| 11,107,046 B2 | 8/2021 | Bowles |
| 11,126,973 B2 | 9/2021 | Silva et al. |
| 11,164,000 B2 | 11/2021 | Lee et al. |
| 11,232,412 B2 | 1/2022 | Hunt et al. |
| 11,288,789 B1 | 3/2022 | Chen et al. |
| 11,302,038 B2 | 4/2022 | Muendel et al. |
| 11,315,093 B2 | 4/2022 | Bowles |
| 11,321,768 B2 | 5/2022 | Beauchamp |
| 11,341,471 B2 | 5/2022 | Dion et al. |
| 11,379,886 B1 | 7/2022 | Fields et al. |
| 11,417,068 B1 | 8/2022 | Burris et al. |
| 11,436,570 B2 | 9/2022 | Bowles et al. |
| 11,443,289 B2 | 9/2022 | Bowles et al. |
| 11,462,868 B2 | 10/2022 | Forutanpour et al. |
| 11,482,067 B2 | 10/2022 | Forutanpour et al. |
| 11,526,932 B2 | 12/2022 | Bowles et al. |
| 11,790,327 B2 | 10/2023 | Bowles et al. |
| 11,843,206 B2 | 12/2023 | Forutanpour et al. |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Rolton et al. |

(56) References Cited

U.S. PATENT DOCUMENTS

| | | |
|---|---|---|
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0088192 A1* | 4/2010 | Bowles .............. G06Q 30/0601 348/E5.022 |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0173576 A1 | 7/2011 | Murphy et al. |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0235812 A1 | 9/2012 | De Mello et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0200912 A1* | 8/2013 | Panagas .............. G06F 3/044 324/756.01 |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0028449 A1 | 1/2014 | Sigal et al. |
| 2014/0038556 A1 | 2/2014 | DeSousa |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0147004 A1 | 5/2014 | Uchida |
| 2014/0150100 A1 | 5/2014 | Gupta et al. |
| 2014/0156883 A1 | 6/2014 | Bowles |
| 2014/0178029 A1 | 6/2014 | Raheman et al. |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088698 A1 | 3/2015 | Ackerman |
| 2015/0088731 A1 | 3/2015 | Ackerman |
| 2015/0120485 A1 | 4/2015 | Nash |
| 2015/0170237 A1 | 6/2015 | Powell |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0309912 A1 | 10/2015 | Nguyen et al. |
| 2015/0324761 A1 | 11/2015 | Nguyen et al. |
| 2015/0324870 A1 | 11/2015 | Nguyen et al. |

(56) References Cited

U.S. PATENT DOCUMENTS

| | | |
|---|---|---|
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0078434 A1 | 3/2016 | Huxham et al. |
| 2016/0087381 A1 | 3/2016 | Wong et al. |
| 2016/0092849 A1 | 3/2016 | Cirannek et al. |
| 2016/0098689 A1* | 4/2016 | Bowles ............... G06Q 10/30 705/23 |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0301786 A1 | 10/2016 | Koltsov et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0110902 A1 | 4/2017 | Miller |
| 2017/0115235 A1 | 4/2017 | Ohlsson et al. |
| 2017/0169401 A1 | 6/2017 | Beane et al. |
| 2017/0221110 A1 | 8/2017 | Sullivan et al. |
| 2017/0256051 A1 | 9/2017 | Dwivedi et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2017/0343481 A1 | 11/2017 | Jahanshahi et al. |
| 2018/0084094 A1 | 3/2018 | Sinha et al. |
| 2018/0101810 A1 | 4/2018 | Feng et al. |
| 2018/0157246 A1 | 6/2018 | Huang et al. |
| 2018/0157820 A1 | 6/2018 | Adams et al. |
| 2018/0160269 A1 | 6/2018 | Baarman et al. |
| 2018/0165655 A1 | 6/2018 | Marcelle et al. |
| 2018/0240144 A1 | 8/2018 | Curtis |
| 2018/0293566 A1 | 10/2018 | Engles et al. |
| 2018/0293664 A1 | 10/2018 | Zhang et al. |
| 2018/0321163 A1 | 11/2018 | Casadio |
| 2018/0322623 A1 | 11/2018 | Memo et al. |
| 2018/0342050 A1 | 11/2018 | Fitzgerald et al. |
| 2018/0350163 A1 | 12/2018 | Pofale et al. |
| 2019/0019147 A1 | 1/2019 | McCarty et al. |
| 2019/0051090 A1 | 2/2019 | Goldberg et al. |
| 2019/0066075 A1 | 2/2019 | Lobo et al. |
| 2019/0066439 A1 | 2/2019 | Pinkus |
| 2019/0073566 A1 | 3/2019 | Brauer |
| 2019/0073568 A1 | 3/2019 | He et al. |
| 2019/0102874 A1 | 4/2019 | Goja |
| 2019/0166278 A1 | 5/2019 | Hiyama et al. |
| 2019/0222748 A1 | 7/2019 | Weir et al. |
| 2019/0251777 A1 | 8/2019 | Abdelmalak et al. |
| 2019/0272628 A1 | 9/2019 | Tsou |
| 2019/0279431 A1 | 9/2019 | Wurmfeld et al. |
| 2019/0318465 A1 | 10/2019 | Nguyen |
| 2019/0372827 A1 | 12/2019 | Vasseur et al. |
| 2020/0020097 A1 | 1/2020 | Do et al. |
| 2020/0042969 A1 | 2/2020 | Ray |
| 2020/0066067 A1 | 2/2020 | Herman et al. |
| 2020/0090137 A1 | 3/2020 | Bowles et al. |
| 2020/0104720 A1 | 4/2020 | Boa et al. |
| 2020/0175669 A1 | 6/2020 | Bian et al. |
| 2020/0202319 A1 | 6/2020 | Forutanpour et al. |
| 2020/0202405 A1 | 6/2020 | Glickman et al. |
| 2020/0241891 A1 | 7/2020 | Li et al. |
| 2020/0265487 A1 | 8/2020 | Forutanpour et al. |
| 2020/0393742 A1 | 12/2020 | Dion et al. |
| 2020/0410793 A1 | 12/2020 | Folco |
| 2021/0012315 A1 | 1/2021 | Priebatsch |
| 2021/0081698 A1 | 3/2021 | Lindeman et al. |
| 2021/0081914 A1 | 3/2021 | Nelms et al. |
| 2021/0110366 A1 | 4/2021 | Dion et al. |
| 2021/0110440 A1 | 4/2021 | Dion et al. |
| 2021/0174312 A1 | 6/2021 | Bowles et al. |
| 2021/0192484 A1 | 6/2021 | Forutanpour et al. |
| 2021/0209512 A1 | 7/2021 | Gaddam et al. |
| 2021/0209746 A1 | 7/2021 | Johnson et al. |
| 2021/0224867 A1 | 7/2021 | Bordeleau et al. |
| 2021/0254966 A1 | 8/2021 | Hur et al. |
| 2021/0255240 A1 | 8/2021 | McGrath |
| 2021/0255240 A1 | 8/2021 | McGrath |
| 2021/0272208 A1 | 9/2021 | Leise et al. |
| 2021/0278338 A1 | 9/2021 | Jung |
| 2021/0295494 A1 | 9/2021 | Forutanpour et al. |
| 2021/0327203 A1 | 10/2021 | Shah |
| 2021/0343030 A1 | 11/2021 | Sagnoas |
| 2021/0357545 A1 | 11/2021 | Sugawara et al. |
| 2022/0027879 A1 | 1/2022 | Bowles et al. |
| 2022/0050897 A1 | 2/2022 | Gaddam et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0164833 A1 | 5/2022 | Dion et al. |
| 2022/0172178 A1 | 6/2022 | Forutanpour et al. |
| 2022/0187802 A1 | 6/2022 | Wittenberg et al. |
| 2022/0198407 A1 | 6/2022 | Beane et al. |
| 2022/0262189 A1 | 8/2022 | Dion et al. |
| 2022/0277281 A1 | 9/2022 | Dion et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |
| 2023/0196865 A1 | 6/2023 | Forutanpour et al. |
| 2023/0264871 A1 | 8/2023 | Williams et al. |
| 2023/0274346 A1 | 8/2023 | Bowles et al. |
| 2023/0297974 A1 | 9/2023 | Bowles et al. |
| 2023/0306384 A1 | 9/2023 | Bowles et al. |
| 2023/0371729 A1 | 11/2023 | Williams et al. |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 201956656 U | 8/2011 |
| CN | 102315630 A | 1/2012 |
| CN | 102467728 A | 5/2012 |
| CN | 202351953 | 7/2012 |
| CN | 202353475 U | 7/2012 |
| CN | 202394296 | 8/2012 |
| CN | 102654927 | 9/2012 |
| CN | 102682597 A | 9/2012 |
| CN | 202564711 U | 11/2012 |
| CN | 202585951 U | 12/2012 |
| CN | 202702438 U | 1/2013 |
| CN | 202711369 U | 1/2013 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |

(56) References Cited

FOREIGN PATENT DOCUMENTS

| | | |
|---|---|---|
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| CN | 205129815 U | 4/2016 |
| CN | 205132514 U | 4/2016 |
| CN | 205140067 U | 4/2016 |
| CN | 106022379 A | 10/2016 |
| CN | 303896361 S | 10/2016 |
| CN | 106203643 A | 12/2016 |
| CN | 106293734 A | 1/2017 |
| CN | 106372638 A | 2/2017 |
| CN | 304051346 S | 2/2017 |
| CN | 304139831 S | 5/2017 |
| CN | 304169301 S | 6/2017 |
| CN | 206440635 U | 8/2017 |
| CN | 107220640 A | 9/2017 |
| CN | 206466691 U | 9/2017 |
| CN | 107514978 A | 12/2017 |
| CN | 206861374 U | 1/2018 |
| CN | 207037788 U | 2/2018 |
| CN | 105444678 B | 3/2018 |
| CN | 304702339 S | 6/2018 |
| CN | 304702340 S | 6/2018 |
| CN | 304747709 S | 7/2018 |
| CN | 304795309 S | 8/2018 |
| CN | 108596658 A | 9/2018 |
| CN | 108647588 A | 10/2018 |
| CN | 207993120 U | 10/2018 |
| CN | 207993121 U | 10/2018 |
| CN | 207995226 U | 10/2018 |
| CN | 304842785 S | 10/2018 |
| CN | 108764236 A | 11/2018 |
| CN | 208086545 U | 11/2018 |
| CN | 208172834 U | 11/2018 |
| CN | 304958348 S | 12/2018 |
| CN | 305014434 S | 1/2019 |
| CN | 305014435 S | 1/2019 |
| CN | 109831575 A | 5/2019 |
| CN | 208819255 U | 5/2019 |
| CN | 208819289 U | 5/2019 |
| CN | 208819290 U | 5/2019 |
| CN | 208969761 U | 6/2019 |
| CN | 305275610 S | 7/2019 |
| CN | 110333876 A | 10/2019 |
| CN | 110347341 A | 10/2019 |
| CN | 110595361 A | 12/2019 |
| CN | 110653162 A | 1/2020 |
| CN | 110675399 A | 1/2020 |
| CN | 110751002 A | 2/2020 |
| CN | 110788015 A | 2/2020 |
| CN | 110796646 A | 2/2020 |
| CN | 110796647 A | 2/2020 |
| CN | 110796669 A | 2/2020 |
| CN | 110827244 A | 2/2020 |
| CN | 110827245 A | 2/2020 |
| CN | 110827246 A | 2/2020 |
| CN | 110827247 A | 2/2020 |
| CN | 110827248 A | 2/2020 |
| CN | 110827249 A | 2/2020 |
| CN | 110880028 A | 3/2020 |
| CN | 110928730 A | 3/2020 |
| CN | 305638504 S | 3/2020 |
| CN | 110976302 A | 4/2020 |
| CN | 111009073 A | 4/2020 |
| CN | 111080184 A | 4/2020 |
| CN | 210348162 U | 4/2020 |
| CN | 111175318 A | 5/2020 |
| CN | 111210473 A | 5/2020 |
| CN | 305767220 S | 5/2020 |
| CN | 111238430 A | 6/2020 |
| CN | 111262987 A | 6/2020 |
| CN | 111272067 A | 6/2020 |
| CN | 111272388 A | 6/2020 |
| CN | 111272393 A | 6/2020 |
| CN | 111273704 A | 6/2020 |
| CN | 111277466 A | 6/2020 |
| CN | 111277659 A | 6/2020 |
| CN | 111277695 A | 6/2020 |
| CN | 111277696 A | 6/2020 |
| CN | 111290660 A | 6/2020 |
| CN | 111290949 A | 6/2020 |
| CN | 111291661 A | 6/2020 |
| CN | 111292302 A | 6/2020 |
| CN | 111294454 A | 6/2020 |
| CN | 111294459 A | 6/2020 |
| CN | 111307429 A | 6/2020 |
| CN | 111311556 A | 6/2020 |
| CN | 111311687 A | 6/2020 |
| CN | 111311749 A | 6/2020 |
| CN | 111314445 A | 6/2020 |
| CN | 111314535 A | 6/2020 |
| CN | 111325715 A | 6/2020 |
| CN | 111325716 A | 6/2020 |
| CN | 111325717 A | 6/2020 |
| CN | 111325901 A | 6/2020 |
| CN | 210666955 U | 6/2020 |
| CN | 305818424 S | 6/2020 |
| CN | 111439560 A | 7/2020 |
| CN | 211149556 U | 7/2020 |
| CN | 305955503 S | 7/2020 |
| CN | 211291337 U | 8/2020 |
| CN | 211296771 U | 8/2020 |
| CN | 211402187 U | 9/2020 |
| CN | 211515235 U | 9/2020 |
| CN | 211538600 U | 9/2020 |
| CN | 111830293 A | 10/2020 |
| CN | 111830354 A | 10/2020 |
| CN | 111860890 A | 10/2020 |
| CN | 111860891 A | 10/2020 |
| CN | 211630227 U | 10/2020 |
| CN | 306113050 S | 10/2020 |
| CN | 306113051 S | 10/2020 |
| CN | 306113052 S | 10/2020 |
| CN | 212023984 U | 11/2020 |
| CN | 212031269 U | 11/2020 |
| CN | 306164092 S | 11/2020 |
| CN | 306164093 S | 11/2020 |
| CN | 306164094 S | 11/2020 |
| CN | 306164095 S | 11/2020 |
| CN | 112098443 A | 12/2020 |
| CN | 212084259 U | 12/2020 |
| CN | 212268703 U | 1/2021 |
| CN | 212314534 U | 1/2021 |
| CN | 212322247 U | 1/2021 |
| CN | 212364464 U | 1/2021 |
| CN | 306272538 S | 1/2021 |
| CN | 306283626 S | 1/2021 |
| CN | 112348761 A | 2/2021 |
| CN | 112348808 A | 2/2021 |
| CN | 112393880 A | 2/2021 |
| CN | 112395118 A | 2/2021 |
| CN | 212586854 U | 2/2021 |
| CN | 212597202 U | 2/2021 |
| CN | 306323627 S | 2/2021 |
| CN | 112433902 A | 3/2021 |
| CN | 112452935 A | 3/2021 |
| CN | 112455988 A | 3/2021 |
| CN | 112456100 A | 3/2021 |
| CN | 112565505 A | 3/2021 |
| CN | 212677296 U | 3/2021 |
| CN | 212681731 U | 3/2021 |
| CN | 111314537 B | 4/2021 |
| CN | 112613622 A | 4/2021 |
| CN | 112613914 A | 4/2021 |
| CN | 112614117 A | 4/2021 |
| CN | 112614269 A | 4/2021 |
| CN | 112633194 A | 4/2021 |
| CN | 112634245 A | 4/2021 |

(56) References Cited

FOREIGN PATENT DOCUMENTS

| | | |
|---|---|---|
| CN | 112634288 A | 4/2021 |
| CN | 112634301 A | 4/2021 |
| CN | 112672145 A | 4/2021 |
| CN | 112735081 A | 4/2021 |
| CN | 213001252 U | 4/2021 |
| CN | 213004872 U | 4/2021 |
| CN | 112777290 A | 5/2021 |
| CN | 112783702 A | 5/2021 |
| CN | 112816490 A | 5/2021 |
| CN | 112822740 A | 5/2021 |
| CN | 112828842 A | 5/2021 |
| CN | 112837076 A | 5/2021 |
| CN | 112837102 A | 5/2021 |
| CN | 213149008 U | 5/2021 |
| CN | 213301455 U | 5/2021 |
| CN | 213301535 U | 5/2021 |
| CN | 213305483 U | 5/2021 |
| CN | 112907182 A | 6/2021 |
| CN | 112991614 A | 6/2021 |
| CN | 113032198 A | 6/2021 |
| CN | 113034481 A | 6/2021 |
| CN | 113034493 A | 6/2021 |
| CN | 113034529 A | 6/2021 |
| CN | 113034530 A | 6/2021 |
| CN | 113034531 A | 6/2021 |
| CN | 113038012 A | 6/2021 |
| CN | 113052798 A | 6/2021 |
| CN | 113110806 A | 7/2021 |
| CN | 113114794 A | 7/2021 |
| CN | 113132523 A | 7/2021 |
| CN | 113160494 A | 7/2021 |
| CN | 113190215 A | 7/2021 |
| CN | 113191789 A | 7/2021 |
| CN | 213765490 U | 7/2021 |
| CN | 213796595 U | 7/2021 |
| CN | 213807304 U | 7/2021 |
| CN | 306700330 S | 7/2021 |
| CN | 113220647 A | 8/2021 |
| CN | 113220648 A | 8/2021 |
| CN | 113237473 A | 8/2021 |
| CN | 113238680 A | 8/2021 |
| CN | 113238905 A | 8/2021 |
| CN | 113252678 A | 8/2021 |
| CN | 113254292 A | 8/2021 |
| CN | 113254293 A | 8/2021 |
| CN | 113254294 A | 8/2021 |
| CN | 113268162 A | 8/2021 |
| CN | 113298078 A | 8/2021 |
| CN | 113301202 A | 8/2021 |
| CN | 113329222 A | 8/2021 |
| CN | 213917879 U | 8/2021 |
| CN | 213933659 U | 8/2021 |
| CN | 306744667 S | 8/2021 |
| CN | 306744668 S | 8/2021 |
| CN | 306786433 S | 8/2021 |
| CN | 306786434 S | 8/2021 |
| CN | 113422860 A | 9/2021 |
| CN | 214160736 U | 9/2021 |
| CN | 214162705 U | 9/2021 |
| CN | 214427985 U | 10/2021 |
| CN | 113591066 A | 11/2021 |
| CN | 113591963 A | 11/2021 |
| CN | 215246545 U | 12/2021 |
| CN | 215247165 U | 12/2021 |
| CN | 215247245 U | 12/2021 |
| CN | 215247426 U | 12/2021 |
| CN | 215262785 U | 12/2021 |
| CN | 215262787 U | 12/2021 |
| CN | 215266884 U | 12/2021 |
| CN | 215266954 U | 12/2021 |
| CN | 215325354 U | 12/2021 |
| CN | 113947445 A | 1/2022 |
| CN | 215556081 U | 1/2022 |
| CN | 215575427 U | 1/2022 |
| CN | 215576764 U | 1/2022 |
| CN | 215576765 U | 1/2022 |
| CN | 215703219 U | 2/2022 |
| CN | 216612155 U | 5/2022 |
| CN | 112672145 B | 2/2023 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| HK | 30014296 A | 8/2020 |
| JP | 7112801 | 5/1995 |
| JP | H7334583 | 12/1995 |
| JP | H11242005 | 9/1999 |
| JP | 2000121564 | 4/2000 |
| JP | 2000171409 A | 6/2000 |
| JP | 2000180371 | 6/2000 |
| JP | 3123095 | 1/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2017093938 | 6/2017 |
| JP | 2019012474 | 1/2019 |
| JP | 3223233 U | 9/2019 |
| JP | 2022539909 A | 9/2022 |
| JP | 2022539910 A | 9/2022 |
| JP | 2022539912 A | 9/2022 |
| JP | 2022545336 A | 9/2022 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |

(56) References Cited

FOREIGN PATENT DOCUMENTS

| | | |
|---|---|---|
| KR | 101329949 | 11/2013 |
| KR | 20140037543 | 3/2014 |
| KR | 101599251 | 3/2016 |
| KR | 20180088062 | 8/2018 |
| KR | 20180088063 | 8/2018 |
| KR | 1020180086617 | 8/2018 |
| KR | 20180117278 | 10/2018 |
| KR | 20190026131 | 3/2019 |
| KR | 20190107593 | 9/2019 |
| KR | 20190107595 | 9/2019 |
| KR | 20190107596 | 9/2019 |
| KR | 1020190107594 | 9/2019 |
| KR | 1020200115308 | 10/2020 |
| KR | 20210020717 | 2/2021 |
| KR | 1020210059148 | 5/2021 |
| KR | 1020210107515 | 9/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019012505 | 1/2019 |
| WO | WO2019012506 | 1/2019 |
| WO | WO2019212513 | 11/2019 |
| WO | WO2019212515 | 11/2019 |
| WO | WO2020082991 | 4/2020 |
| WO | WO2020204503 | 10/2020 |
| WO | WO2021019286 | 2/2021 |
| WO | WO2021082918 A1 | 5/2021 |
| WO | WO2021082919 A1 | 5/2021 |
| WO | WO2021082920 A1 | 5/2021 |
| WO | WO2021082921 A1 | 5/2021 |
| WO | WO2021082922 A1 | 5/2021 |
| WO | WO2021082923 | 5/2021 |
| WO | WO2021142009 | 7/2021 |
| WO | WO2021147385 | 7/2021 |
| WO | WO2021147386 | 7/2021 |
| WO | WO2021147387 | 7/2021 |
| WO | WO2021147388 A1 | 7/2021 |
| WO | WO2021172803 | 9/2021 |
| WO | WO2022034298 | 2/2022 |
| WO | WO2022090999 | 5/2022 |
| WO | WO2022091000 | 5/2022 |

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

Cnet, "Tackling LCD "burn ins", and dead/stick Pixels", published Sep. 2, 2009, retrieved from http://www.cnet.com/news/tackling-LCD-burn-ins-and-deadstuck-pixels/.

Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.

Cybercom Group Europe AB, "The OMSI 2.0 Interface Supports," OMSI 2.0 Description, available at least before Oct. 2008, 1 page.

Cybercom Group, "Leading Telecom Organisations DRAFT IDS 10/26ress Device Management Issues," Press Release, 2007, 1 page.

Evgenii Masunov, Mar. 25, 2010, http://www.appleinsider.ru/news/ipone-obladaet-luchshim-tachskrinom-proverno_robotom.html, 4 pages.

Foster et al., "Automated Visual Inspection: A Tutorial" 1990 Computers Ind. Engng. vol. 18(4): 493-504.

Geekanoids, You Tube Video, "Apple iphone 3GS Unboxing and Review", uploaded on Jun. 19, 2009, retrieved from http://www.youtube.com/watch?v=GCEi9QAeDqk on Sep. 2, 2009.

Geyer et al. "The economics of cell phone reuse and recylcing," The International Journal of Advanced Manufacturing Technology, 47(5): 515-525, 2010.

Graffia et al., "Retail Station for E-Device Identification, Assessment, and Trade-In", Jun. 6, 2014 (Drawings and Specification) (Year: 2014).

GSM Arena Glossary, "LCD (Liquid Crystal Display", retrieved from http://www.gsmarena.com/glossary.php3?term=LCD on Apr. 28, 2016, 1 page.

International Numbering Plan, www.numberingplans.com, 2 pages.

Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].

Kanter, James Max, "Color Crack:Identifying Cracks in Glass," dated Dec. 9, 2014; retrieved from the internet http://www.jmaxkanter.com/static/papers/color_crack.pdf on Sep. 22, 2017.

Lambert, Emily, "Use It Up, Wear It Out", Forbes 175.5 (2005): 77-78. Business Source Complete. Web. Jan. 6, 2015, 3 pages.

Littleton Partners with Donations Ink (2006, Jan. 19) US Fed News Service, Including US State News. Web. Jan. 6, 2015, 1 page.

MobileGazette.com, "2006 in Review: The Good, The Bad and The Ugly", published Dec. 2006, retrieved from http://www.mobilegazette.com/2006-review-06x12x22.htm on Nov. 11, 2015.

(56) References Cited

OTHER PUBLICATIONS

Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route To Feeling Green," Xconomy, Jan. 22, 2014, pp. 1-3.
Rosebrock, "How to Build a Kick-Ass Mobile Document Scanner in Just 5 Minutes" Pylmage Search, Sep. 2014, 19 pages.
Shotton et al., "Efficiently Combining Contour and Texture Cues for Object Recognition", Proceedings of the British Machine Vision Conference 2008, (Sep. 1, 2008), p. 7.1-7.10 * abstract *.
Shue, Jiuh-Bling et al. "Extended consumer responsibility: Syncretic value-oriented pricing strategies for trade-in-for-upgrade programs" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications AB, "P800/P802," White Paper, 2003, 128 pages.
Sony Ericsson Mobile Communications AB, "T68i/T68ie," White Paper, 2002, 71 pages.
Tecace Software: "Your phone appraisal—Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
International Search Report and Written Opinion dated Nov. 29, 2021 in International Application No. PCT/US2021/071192, 15 pages.
International Search Report and Written Opinion dated Dec. 6, 2021 in International Application No. PCT/US2021/071191, 15 pages.
Invitation to Pay Additional Fees & Partial Search Report dated Nov. 29, 2021 in International Application No. PCT/US2021/071200, 11 pages.
International Search Report and Written Opinion dated Jan. 24, 2022 in International Application No. PCT/US2021/071200, 19 pages.
International Search Report and Written Opinion dated Nov. 22, 2021 in International Application No. PCT/US2021/071201, 17 pages.
Tech Spurt, "Sandisk iXpand Review | Wireless Charger & Auto Photo Backup!" https://www.youtube.com/watch?v=zemKQ6xIJLww, Aug. 21, 2019, 1 page.
Wiley Encyclopedia of Computer Science and Technology (2009).
Invitation to Pay Additional Fees & Partial Search Report mailed Jun. 6, 2023 in International Application No. PCT/US2023/062371, 14 pages.
International Search Report and Written Opinion mailed Jul. 27, 2023 in International Application No. PCT/US2023/062371, 19 pages.

\* cited by examiner

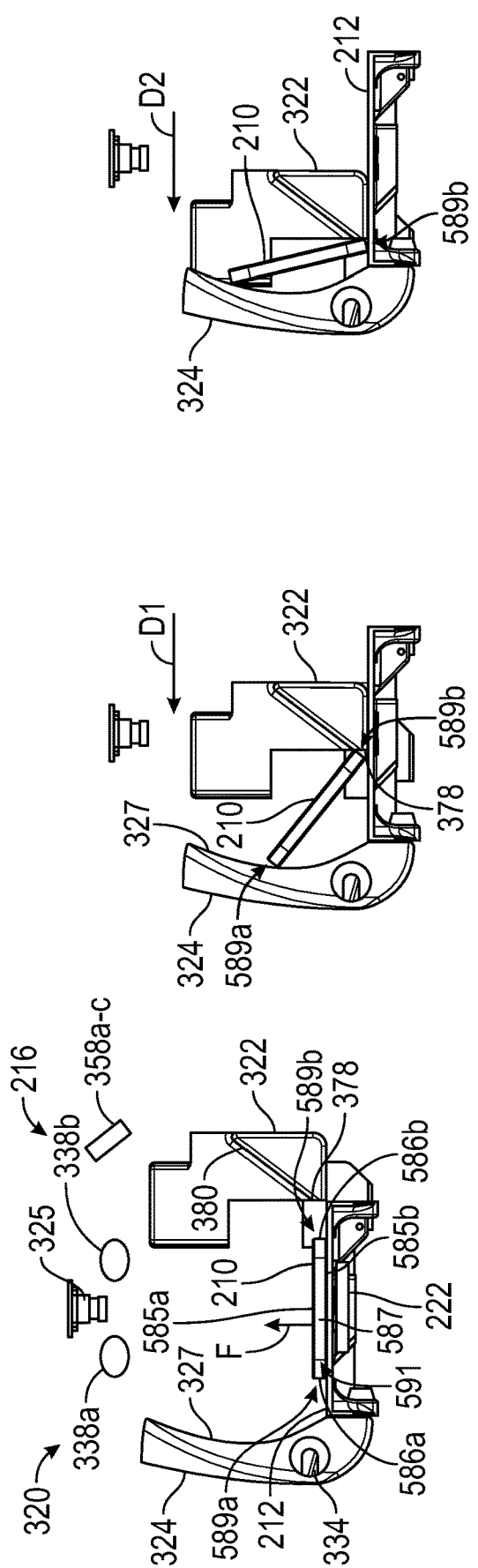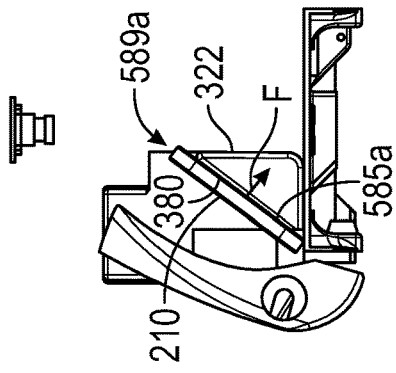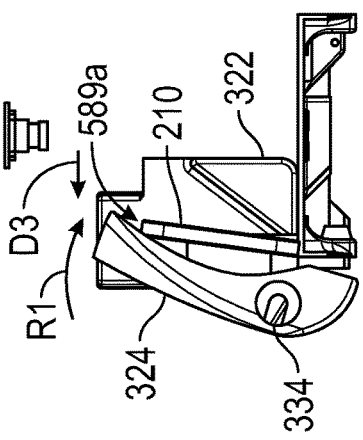

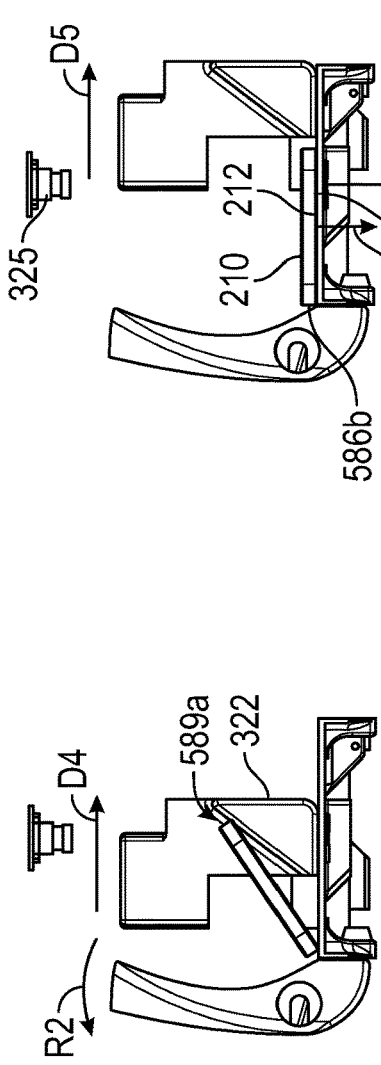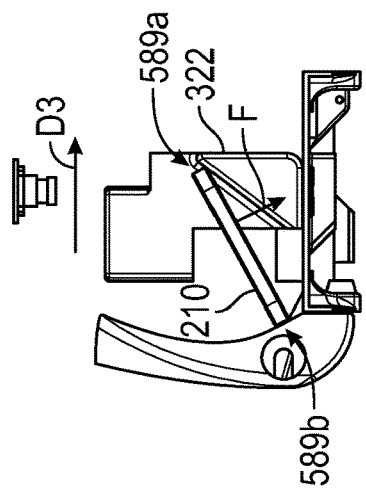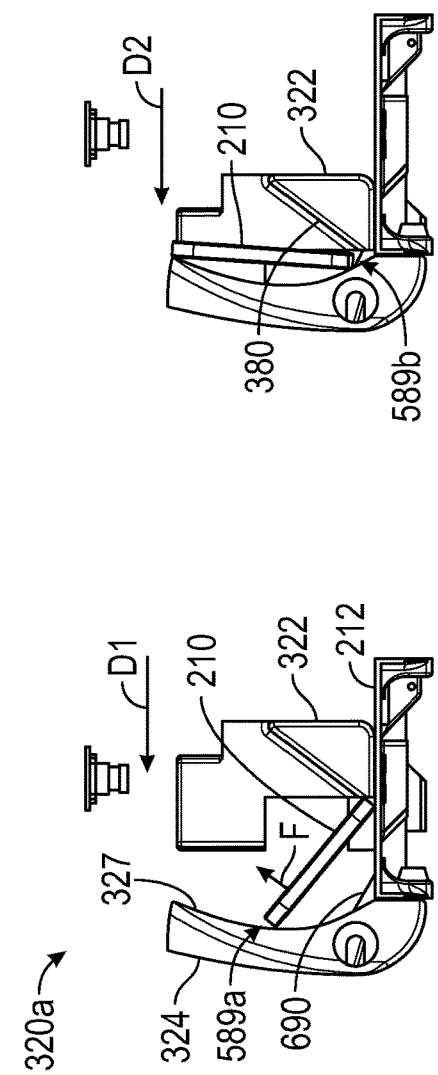

KIOSK FOR EVALUATING AND PURCHASING USED ELECTRONIC DEVICES

CROSS-REFERENCE TO RELATED APPLICATIONS INCORPORATED BY REFERENCE

This application claims the benefit of U.S. Provisional Patent Application No. 63/066,794, filed Aug. 17, 2020, U.S. Provisional Patent Application No. 63/116,007, filed Nov. 19, 2020, and U.S. Provisional Patent Application No. 63/116,020, filed Nov. 19, 2020, the entireties of which are incorporated by reference herein.

TECHNICAL FIELD

The present disclosure is generally related to consumer operated kiosks for purchasing mobile phones and other mobile electronic devices from users.

BACKGROUND

There are more mobile phones in use now than there are people on the planet. The rapid growth of mobile phones is due in part to the rapid pace at which they evolve. Because of the rapid pace of development, a relatively high percentage of mobile phones are replaced every year as consumers continually upgrade to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones are simply tossed into junk drawers or otherwise kept until a suitable disposal solution arises.

Although many mobile phone retailers and cell carrier stores now offer mobile phone trade-in or buyback programs, many old phones still end up in landfills or are improperly disassembled and disposed of in developing countries. Unfortunately, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can recycle and/or sell their used mobile phones using self-service kiosks located in malls, retail stores, or other publicly accessible areas. Such kiosks are operated by ecoATM, LLC, the assignee of the present application.

BRIEF DESCRIPTION OF THE DRAWINGS

FIGS. 5A-5G are a series of front views of the kiosk inspection area illustrating operation of a mobile device flipping apparatus configured in accordance with embodiments of the present technology.

FIGS. 6A-6C are a series of front views illustrating operation of a mobile device flipping apparatus configured in accordance with other embodiments of the present technology.

DETAILED DESCRIPTION

Figure 2A:
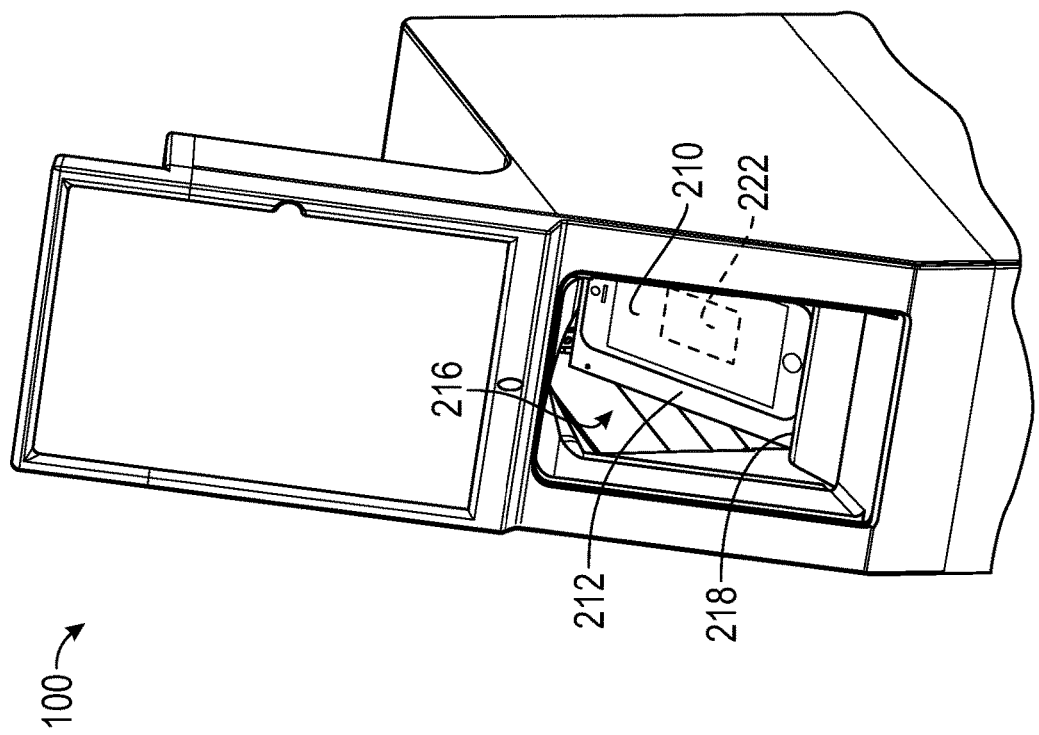
FIGS. 2A-2C are a series of enlarged isometric views illustrating structures and functions associated with an inspection area of the kiosk of FIG. 1, configured in accordance with embodiments of the present technology.

The following disclosure describes various embodiments of systems and methods that enable users to sell or recycle mobile phones and other electronic devices. In some embodiments, the systems described herein include a kiosk having an apparatus that can turn a mobile device over in an inspection area. As described in greater detail below, the apparatus (which is referred to herein as a "flipping apparatus") enables the kiosk to visually inspect and evaluate the front side of a mobile phone with one or more cameras positioned above the phone, and then use the same one or more cameras to visually inspect and evaluate the back side of the mobile phone after it has been flipped. In contrast to the kiosks disclosed herein, some mobile phone recycling kiosks visually inspect mobile phones by placing them on a transparent plate positioned between at least one camera positioned above the transparent plate and at least one camera positioned below the transparent plate. The upper camera visually inspects the front side of the mobile phone and the lower camera visually inspects the back side of the mobile phone through the transparent plate. Accordingly, one benefit of some embodiments of the kiosks disclosed herein is that the mobile device flipping apparatus eliminates the need to position cameras both above and below a mobile device for visual inspection. Eliminating the lower camera and associated hardware can reduce the size and cost of the kiosk.

Certain details are set forth in the following description and in FIGS. 1-10B to provide a thorough understanding of various embodiments of the present technology. In other instances, well-known structures, materials, operations and/or systems often associated with smartphones and other handheld mobile electronic devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the present technology. Accordingly, other embodiments can have other details, dimensions, angles and features without departing from the spirit or scope of the present disclosure. In addition, those of ordinary skill in the art will appreciate that further embodiments of the present technology can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1:
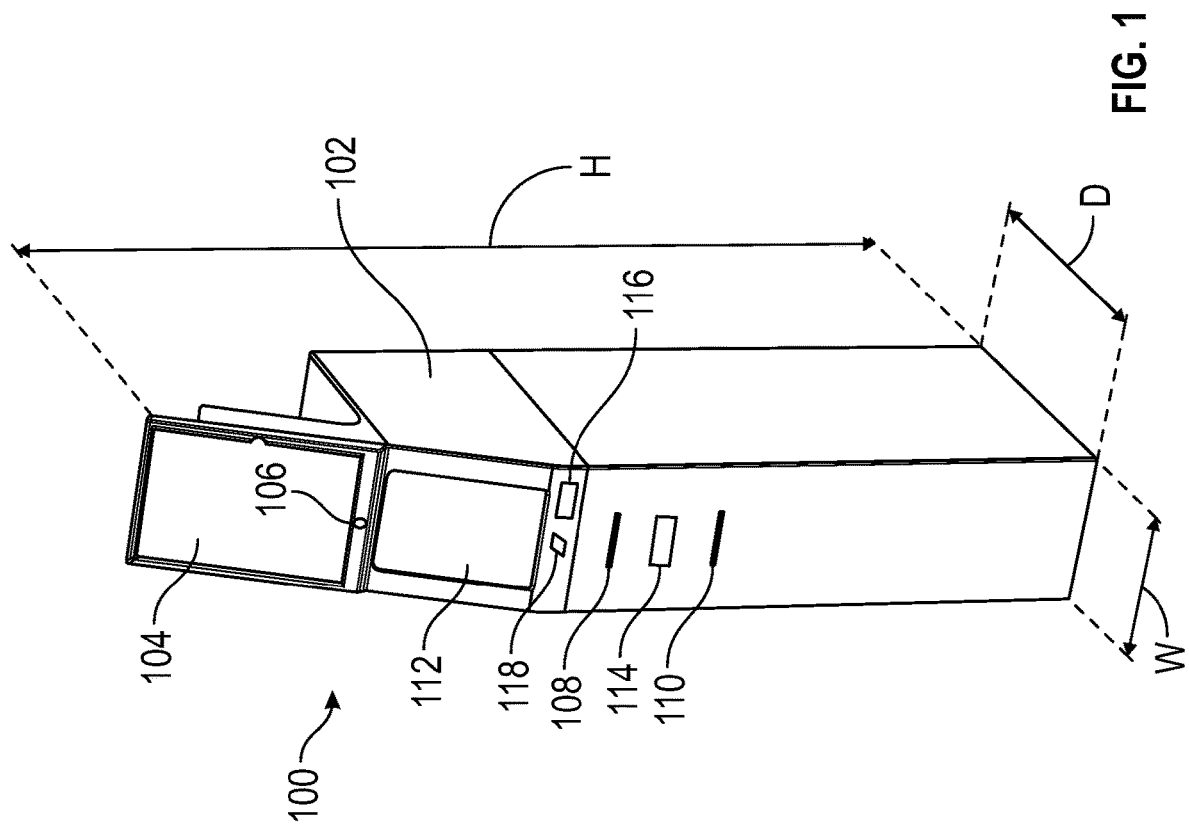
FIG. 1 is an isometric view of a consumer operated kiosk for purchasing mobile electronic devices from users, configured in accordance with embodiments of the present technology.

FIG. 1 is an isometric view of a consumer operated kiosk 100 for purchasing mobile phones and other electronic devices from users, configured in accordance with embodiments of the present technology. The kiosk 100 includes an enclosure or housing 102 that supports a display screen 104 positioned above an inspection area access door 112. The access door 112 can be formed from, e.g., one or more polymers (e.g., polyethylene, polycarbonate, etc.), glass, etc. that can be transparent, opaque or solid. The housing 102 can be manufactured from, for example, sheet metal, plastic panels, etc. in a conventional manner. By way of example only, in some embodiments, the kiosk 100 can have a width W of from about 7 inches to about 14 inches, or from about 8 inches to about 9 inches; a depth D of from about 12 inches to about 18 inches, or from 14 inches to about 15 inches; and an overall height H of from about 3 feet to about 5 feet, or about 4 feet. The foregoing dimensions are but one example; in other embodiments, kiosks configured in accordance with the present disclosure can have other dimensions without departing from the present disclosure.

A plurality of user interface devices are provided on a front portion of the housing 102 for providing instructions and other information to users, and/or for receiving user inputs and other information from users. For example, in some embodiments, the display screen 104 can include a liquid crystal display (LCD), a light emitting diode (LED) display screen, an organic LED (OLED) display screen, an e-ink display, a projected display (such as a heads-up display or a head-mounted device), and the like, for providing information, prompts, etc. to users. In some embodiments, the display screen 104 can be a display screen from a computing device, such as a tablet or a tablet computer (e.g., a Microsoft® Surface Pro® Tablet, an Apple® iPad®, etc.). The display screen 104 can also display graphical user interfaces (GUIs), including touchscreens, for receiving user input and responses to displayed prompts. In addition or alternatively, the kiosk 100 can include a separate keyboard or keypad for receiving user inputs. The kiosk 100 can also include an ID reader or scanner 108 (e.g., a driver's license scanner), a fingerprint scanner 118, and one or more external cameras 106 (e.g., digital still and/or video cameras). The kiosk 100 can additionally include output devices such as a label printer (e.g., a barcode label printer) having an outlet 116, a payment (e.g., cash, voucher, coupon, etc.) dispenser having an outlet 110, and/or a receipt dispenser having an outlet 114. Although not identified in FIG. 1, the kiosk 100 can further include, e.g., a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), as well as other user input and/or output devices. Additionally, the kiosk 100 can also include a barcode reader (for reading, e.g., a barcode displayed on a mobile device), a QR code reader (for reading, e.g., a QR displayed on a mobile device), a package or bag dispenser (e.g., a shipping package dispenser), a digital signature pad, etc. The user interface devices described above are representative of such devices that can be included with some embodiments the kiosk 100. Depending on the particular use case or commercial application, other embodiments of the kiosks disclosed herein can include other devices, or one or more of the above devices may be omitted. Accordingly, embodiments of the kiosk 100 are not limited to the type or arrangement of user interface devices described above.

Figure 2C:
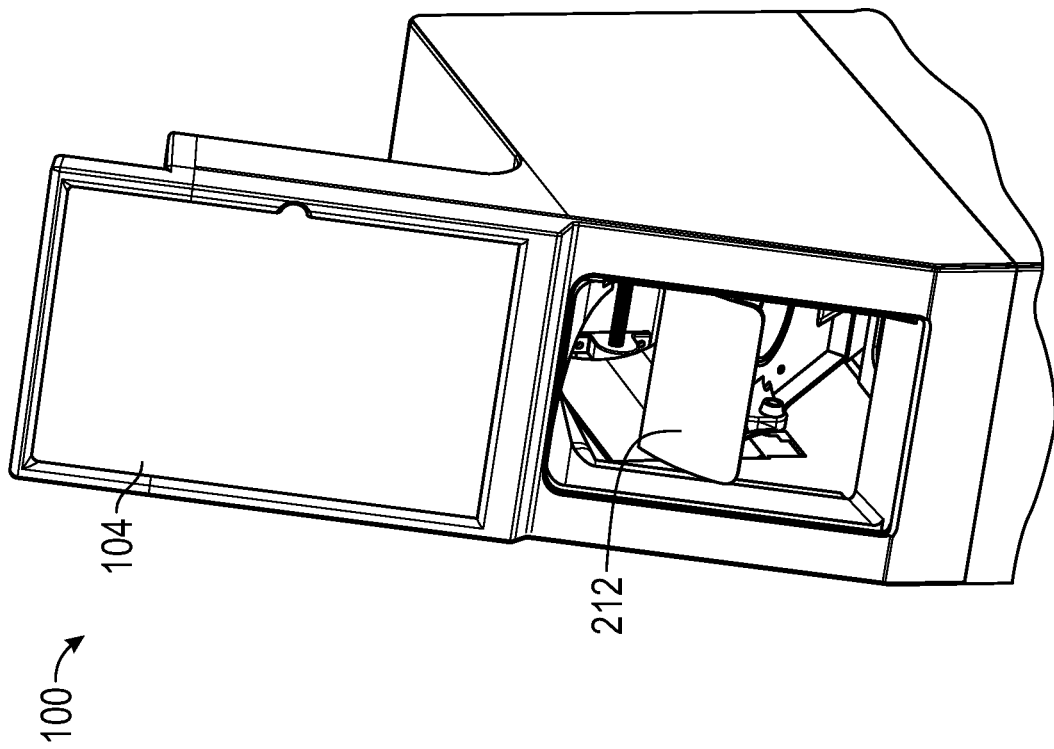
Figure 2B:
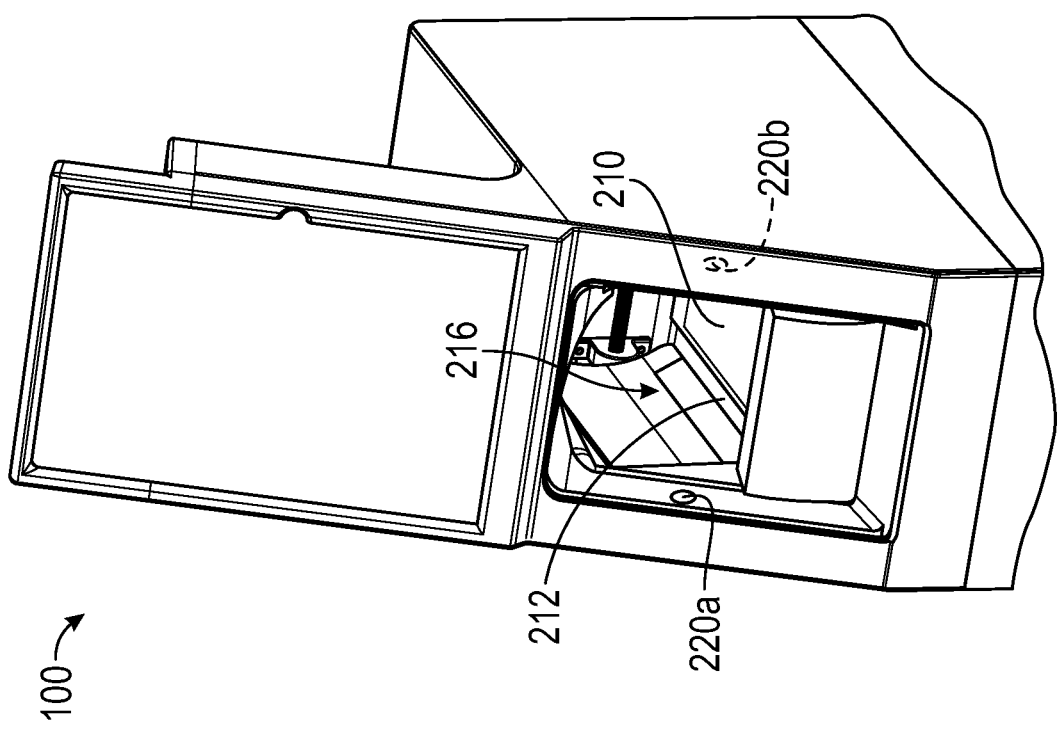

FIGS. 2A-2C are a series of enlarged isometric views illustrating structures and functions associated with an inspection area 216 of the kiosk 100. Referring first to FIG. 2A, in some embodiments, a user wishing to sell a used electronic device (e.g., a mobile phone 210) via the kiosk 100 would first approach the kiosk 100 and follow prompts displayed on the display screen 104. Such prompts, for example, may ask the user what type of phone they wish to sell, who the carrier is, etc. To begin the process, the access door 112 (FIG. 1) retracts upwardly behind the display screen 104 to expose the inspection area 216. The inspection area 216 includes an inspection tray 212 having a shelf 218. The user is instructed (via, e.g., prompts on the display screen 104) to position the mobile device 210 on the shelf 218 in the inspection area 216 as shown in FIG. 2A. In some embodiments, the mobile phone 210 is positioned on the inspection tray 212 so that a display of the mobile phone 210 (e.g., an LCD, an LED display, etc.) is facing outwardly toward the user with an electrical connector receptacle on the mobile phone 210 facing downwardly toward the shelf 218. As described in greater detail below, by positioning the mobile phone 210 on the shelf 218 in this manner, the user can simultaneously connect the mobile phone 210 to an appropriate electrical connector (not shown) protruding outwardly from the shelf 218. The appropriate electrical connector can be selected by the kiosk 100 in response to, for example, user responses to questions regarding the type of phone presented on the display screen 104. In some embodiments, the user may be instructed (via, e.g., prompts on the display screen 104) to remove any cases, stickers, or other accessories from the mobile phone 210 prior to placing the mobile phone 210 in the inspection area 216. After the user has properly positioned the mobile phone 210 on the inspection tray 212 and the phone is powered up, the user can interact with the mobile phone 210 (via, e.g., the touch screen of the mobile phone 210) in response to prompts displayed on the display screen 104. As described in greater detail below, these interactions can cause the mobile phone 210 to display information about the phone (e.g., model identification, serial number, etc.) that can be captured by a camera (not shown) in the inspection area 216 and used by the kiosk to facilitate the phone inspection process, provide a price quote, etc.

In some embodiments, the kiosk 100 can also include a wireless charger 222 positioned in relatively close proximity to the mobile phone 210 when the phone is positioned on the inspection tray 212 as shown in FIG. 2A. For example, in the illustrated embodiment the wireless charger 222 is mounted to the backside of the inspection tray 212. The wireless charger 222 can be, for example, a "Qi wireless charger" that functions in accordance with the Qi open interface standard that defines wireless power transfer using inductive charging over distances of up to, e.g., about 1.6 inches. In operation, the wireless charger 222 can provide a quick charge to the mobile phone 210 if it is placed on the inspection tray 212 without power. Additionally, as described in greater detail below, in operation the wireless charger 222 receives certain information about the mobile phone (e.g., make, model, a unique 32-bit identifier associated with the phone, Qi standard, etc.) as part of the charging process. This information can be transmitted to the kiosk processor and used to, for example, identify the correct electrical connector (e.g., a USB-C or Lightning connector) to present to the user on the inspection tray shelf 218. This information can also be used to determine the appropriate User Interface (UI) flow/instructions to display to the user via the display screen 104 for the phone purchase process. Additionally, by identifying the unique ID of the mobile phone 210 and monitoring the device ID during the kiosk transaction, the wireless charger 222 enables the kiosk 100 to determine if the user attempts to switch the mobile phone 210 with another mobile phone (e.g., another mobile phone of the same model but of lesser value) at any time during the transaction. If so, the kiosk 100 can stop the transaction, display a warning to the user, and/or take other steps to prevent the user from committing fraud by pricing one phone but actually selling the kiosk a different phone of, e.g., lesser value.

Turning next to FIG. 2B, the inspection tray 212 has been rotated rearwardly from the angled position of FIG. 2A into a horizontal position so that the mobile phone 210 is facing upwardly in the inspection area 216. Although, in some embodiments, the access door 112 (FIG. 1) would normally be closed during this stage of kiosk operation, the access door 112 is not shown in FIG. 2B (or FIG. 2C) to better illustrate operation of the inspection tray 212 and the inspection area 216. With the mobile phone 210 in this position, the kiosk 100 can perform an electrical inspection of the mobile phone 210 via, e.g., the electrical connector (not shown) to identify the phone and further evaluate the condition of the phone, as well as specific component and operating parameters such as memory, carrier, etc. For example, in some embodiments, the kiosk 100 (e.g., a kiosk CPU or other processing device) can query the mobile phone 210 (by using, e.g., an operating system API) to obtain characteristic information about the mobile phone 210, which can include device identification, make, model, and/or configuration. In other embodiments, the characteristic information can further include device functionality, including hardware/software configuration, charging capability, memory capacity, etc. Information necessary to identify and/or evaluate a mobile device such as the mobile phone 210 can include, for example, a unique identifier (e.g., an IMEI number or an MEID or equivalent number of a mobile phone, a hardware media access control address (MAC address) of a networkable device, or a model number and serial number of the electronic device), information describing the device manufacturer (e.g., a manufacturer name or ID code), model, characteristics and capabilities (e.g., CPU type and speed, storage capacity (SRAM, DRAM, disk, etc.)), wireless carrier, radio bands (frequency ranges and encodings such as CDMA, GSM, LTE, etc.), color and/or condition, and so on. In other embodiments, the electrical analysis can include evaluating the condition and/or functionality of the charging circuit of the electronic device. In some embodiments, the wireless charger 222 (FIG. 2A) and/or the electrical connector can be used to evaluate the charging circuit of the mobile phone 210. For example, in some embodiments, the kiosk 100 can measure the amount of charge current that the charging circuit draws (via, e.g., the wireless charger 222 and/or the electrical connector), and the kiosk 100 can use the corresponding current measurement signal to determine whether the charging circuit is functional or damaged. In some embodiments, the kiosk 100 can perform the electrical analysis using one or more of the methods and/or systems described in detail in the patents and patent applications identified herein and incorporated herein by reference in their entireties.

Although the embodiments described above include establishing an electrical connection between the mobile phone 210 and the kiosk 100 via an electrical connector, in other embodiments the kiosk 100 can establish a wireless connection with the mobile phone 210 to facilitate performing all or a portion of the phone evaluation and purchase steps described herein. For example, in some embodiments the kiosk 100 can include a wireless radio transceiver that is accessible by user devices (e.g., the mobile phone 210). The kiosk 100 can establish a wireless connection with the mobile phone 210 by providing connection instructions and/or authentication information for the user to enter via the mobile phone 210 and/or via the display screen 104. For example, the kiosk 100 can direct the user to make the mobile phone's Bluetooth connection discoverable, and/or can provide a Bluetooth pairing code that the user can type or otherwise enter on the screen of the phone 210 or on the touchscreen of the kiosk 100. As another example, the kiosk 100 can provide a Wi-Fi network name and/or password that when selected and/or entered on the user's phone 210 enables the user to wirelessly connect the device to the indicated Wi-Fi network. In other embodiments, establishing the connection can include providing a visual code or image (e.g., a QR code) for the user to scan using the mobile phone 210, such that scanning the code or image prompts the phone to connect to the kiosk's wireless network (e.g., upon user confirmation). In some embodiments, establishing the connection can include allowing a particular wireless device to join or use the wireless network or make a wireless connection. For example, when the kiosk 100 detects the mobile phone 210 and determines that the device is registered for access or otherwise recognized, the kiosk 100 automatically connects to the mobile phone 210 without requiring further user authentication. In other embodiments, the user can load a mobile app onto the mobile phone 210, and the app can evaluate the electronic device and facilitate wireless communication between the mobile phone 210 and the kiosk 100 to facilitate phone evaluation and purchase by the kiosk 100. Various systems and methods for establishing a wireless connection between the kiosk 100 and a mobile phone or other electronic device of a user are described in at least some of the patents and/or patent applications incorporated herein by reference in their entireties. In other embodiments, wireless connections between the kiosk 100 and mobile phones and other electronic devices can be established using other suitable means known in the art.

In addition to performing an electrical inspection, the kiosk 100 also performs a visual inspection of the mobile phone 210 using one or more cameras (not shown) positioned in the inspection area 216. In some embodiments, the visual inspection can include a 3D visual analysis (of, e.g., the shape and/or size of the phone) to confirm the identification of the mobile phone 210 (e.g., make and model) and/or to evaluate or assess the condition and/or function of the mobile phone 210 and/or its various components and systems. For example, in some embodiments, the one or more cameras can obtain images of the mobile phone 210 (e.g., of the front side, the back side, one or more of the lateral sides, the top side and/or the bottom side) under one or more lighting conditions, and the kiosk 100 can use visual inspection and/or recognition software to analyze the images of the mobile phone 210. In some embodiments, the visual inspection and recognition software can analyze the images to determine the borders of the phone 210 and the corresponding external dimensions of the phone 210. The external dimensions can be utilized to determine a subset of possible mobile phones from a master database of mobile phones stored in memory of the kiosk 100 or stored in a remote database accessible to the kiosk 100 via a network connection. In some embodiments, the visual inspection and recognition software can then use a set of secondary and/or tertiary features of the phone 210 as shown on the images to further distinguish the device. These secondary and tertiary features can include the placement and size of the display, placements and size of the keyboard, unique buttons, placement of ports, and other distinguishing features.

In some embodiments, the inspection tray 212 can be colored (e.g., colored green) so that the technique of chroma key compositing, or chroma keying (sometimes referred to as green screening if used with a green screen), can be used to, e.g., remove the inspection tray 212 from images of the mobile phone 210 obtained by the one or more cameras positioned in the inspection area 216. Chroma keying the images can provide better definition of the phone's physical features and enable the kiosk processor to better determine the size (e.g., width, height and curvature) of the mobile phone 210 based on the images. As described in greater detail below, in other embodiments, rather than being green (or some other opaque color) the inspection tray 212 can be configured as a light table to enable the images to provide a more accurate silhouette of the mobile phone 210 for visual analysis of, e.g., phone dimensions, shape, etc.

The visual analysis can also include an inspection of the mobile phone 210 for cracks or other damage to the display screen (LCD), as well as cracks off of the display screen. For example, in some embodiments, the visual inspection and recognition software can subtract an image of the display screen and/or other portions of the mobile phone 210 obtained by the one or more kiosk cameras from an image of an undamaged phone of the same make and model obtained from a database, e.g. a remote database. The result of the subtraction can identify, e.g., damaged pixels, cracks in the screen, broken or missing parts, and/or low, medium or high wear. In some embodiments, the display of the phone 210 can be illuminated for the images, and in other embodiments the display may be "off" or otherwise not illuminated. In some embodiments, the visual inspection can include performing optical character recognition (OCR) to identify printed or displayed patterns, codes, and/or text, and comparing characteristics of the patterns, codes, and/or text (e.g., layout, size, font, color, etc.) to templates to determine the presence of one or more device identifiers such as model number, serial number, IMEI number, etc. For example, in some embodiments the kiosk 100 can prompt or instruct the user to dial "*#06#" on the mobile phone 210 (via, e.g., the display screen of the mobile phone 210), which can bring up information about the mobile phone 210, such as the IMEI number. Some mobile phones include a unique identifier (e.g., an IMEI number) that is printed or otherwise formed on the phone's Subscriber Identification Module (also known as a "SIM" card) holder or tray. In some embodiments, the kiosk 100 can instruct the user to extract the SIM card tray from their phone and position the SIM card tray on the inspection tray 212 so that the kiosk can perform OCR of the IMEI number on the SIM card tray. Further, in some embodiments the inspection tray 212 can include a designated area or a small tray configured to hold the SIM card tray so that the kiosk camera can obtain an image of the IMEI number for OCR. In some mobile phones (e.g., older iPhones® and Samsung® phones), the IMEI number may be printed or otherwise formed on the back side of the phone (the side opposite the display screen). In some embodiments, the kiosk may prompt the user to place such a phone on the inspection tray 212 with the back side facing outward so that the kiosk camera can obtain an image of the IMEI number printed on the back side for OCR by the kiosk software. In some embodiments, if the kiosk 100 is unable to identify the device identifier(s) using OCR, the kiosk 100 can present an electrical connector to the user and prompt the user to connect the electrical connector to the mobile phone 210 as described above with reference to FIG. 2A. In these embodiments, the kiosk 100 can obtain one or more device identifiers via the electrical connector as described above. As described in greater detail below, the visual inspection can be performed with one or more cameras and the kiosk 100 can perform the visual analysis using one or more of the methods and/or systems described in detail in the patents and patent applications identified herein and incorporated herein by reference in their entireties. In some embodiments, other known methods of detecting damage to the display screen and other parts of the mobile phone 210 can be used, and in yet other embodiments, one or more of the visual inspections described above may be omitted.

As described in greater detail below, in one aspect of the illustrated embodiment, the inspection area 216 includes an apparatus configured to flip the mobile phone 210 when the inspection tray 212 is in the position shown in FIG. 2B so that the front side of the phone (which can also be referred to as a front surface or front face of the mobile phone 210 that includes, e.g., the display screen) is facing downwardly toward the inspection tray 212. This enables the kiosk 100 to perform a visual inspection of the back side of the mobile phone using the same imaging systems (e.g., camera systems, lighting systems, etc.) that were used to inspect the front side of the mobile phone 210. This feature eliminates the need to place the mobile phone 210 on a transparent surface and provide cameras below the transparent surface to visually inspect the back side (which can also be referred to as a back surface or back face of the mobile phone) of the mobile phone 210. In addition to saving cost, this feature can also save space and reduce the size of the kiosk 100.

In some embodiments, the kiosk 100 can include a security feature that can detects if a user reaches into the inspection area 216 at an inappropriate time. For example, the security feature can detect if the user reaches into the inspection area 216 when the inspection tray 212 is in the position shown in FIG. 2B to, e.g., remove the mobile phone 210 and/or switch it for another phone. In some embodiments, the security feature can include a break-beam sensor system having an emitter 220a (e.g., infrared (IR) emitter, a laser beam emitter, etc.) mounted to a sidewall portion of the inspection area 216 just inside the access door opening, and a corresponding sensor 220b (e.g., an IR receiver, laser receiver, etc.) mounted to an opposite sidewall portion on the other side of the opening to detect the beam emitted by the emitter 220a. If the user extends their hand/arm through the access door opening, it will break the beam emitted by the emitter 220a, and the break of the beam will be sensed by the sensor 220b. The sensor 220b can be configured to send a corresponding signal to the kiosk processor, and the kiosk 100 can respond by stopping the transaction, displaying a warning to the user via the display 104, etc. In other embodiments, an internal camera positioned in the inspection area can be used by the kiosk 100 to detect if the user reaches into the inspection area 216 when the inspection tray is in the position shown in FIG. 2B.

After the mobile phone 210 has been fully evaluated and the kiosk 100 has determined a purchase price, the purchase price can be offered to the user via the display screen 104. If the user accepts the purchase price offer, the access door 112 remains closed and the purchase transaction proceeds. For example, in some embodiments the user may be prompted to place his or her identification (e.g., a driver's license) in the ID scanner 108 and provide a thumbprint via the fingerprint reader 118 (FIG. 1). As a fraud prevention measure, the kiosk 100 can be configured to transmit an image of the driver's license to a remote computer screen, and an operator at the remote computer can visually compare the picture (and/or other information) on the driver's license to the person standing in front of the kiosk 100 as viewed by one or more of the cameras 106 (FIG. 1) to confirm that the person attempting to sell the mobile phone 210 is in fact the person identified by the driver's license. In some embodiments, one or more of the cameras 106 can be movable to facilitate viewing of kiosk users, as well as other individuals in the proximity of the kiosk 100. Additionally, the user's fingerprint can be checked against records of known fraud perpetrators. If either of these checks indicate that the person selling the phone presents a fraud risk, the transaction can be declined and the mobile phone 210 returned to the user.

Once the user's identity has been verified, the inspection tray 212 rotates further rearwardly from the horizontal position shown in FIG. 2B to the angled position shown in FIG. 2C so that the mobile phone 210 can slide off of the inspection tray 212 and into a storage bin (not shown). (Although the access door 112 would normally be closed during this stage of operation, the access door 112 is omitted from FIG. 2C for purposes of illustrative clarity.) The kiosk 100 can then provide payment of the purchase price to the user. In some embodiments, payment can be made in the form of cash dispensed from the payment outlet 110. In other embodiments, the user can receive remuneration for the mobile phone 210 in various other useful ways. For example, the user can be paid via a redeemable cash voucher, a coupon, an e-certificate, a prepaid card, etc. that is dispensed from the kiosk 100; or via a gift code, redeemable voucher, coupon, e-certificate, etc., that is sent to the user via email, text, or other form of electronic message. Additionally, in some embodiments the user can be paid via a wired or wireless monetary (e.g., cash) deposit to an electronic account (e.g., a bank account, credit account, loyalty account, online commerce account, mobile wallet, etc.) via, e.g., PayPal, Venmo, etc., or with Bitcoin, etc.

Alternatively, if the user declines the purchase price offer, or if the user's identity cannot be verified or the kiosk 100 otherwise determines that the transaction presents a fraud risk, the transaction can be declined and the mobile phone 210 returned to the user. More specifically, the inspection tray 212 rotates forwardly to the position illustrated in FIG. 2A and the access door 112 opens so that the user can retrieve the mobile phone 210 from the kiosk 100.

Figure 3A:
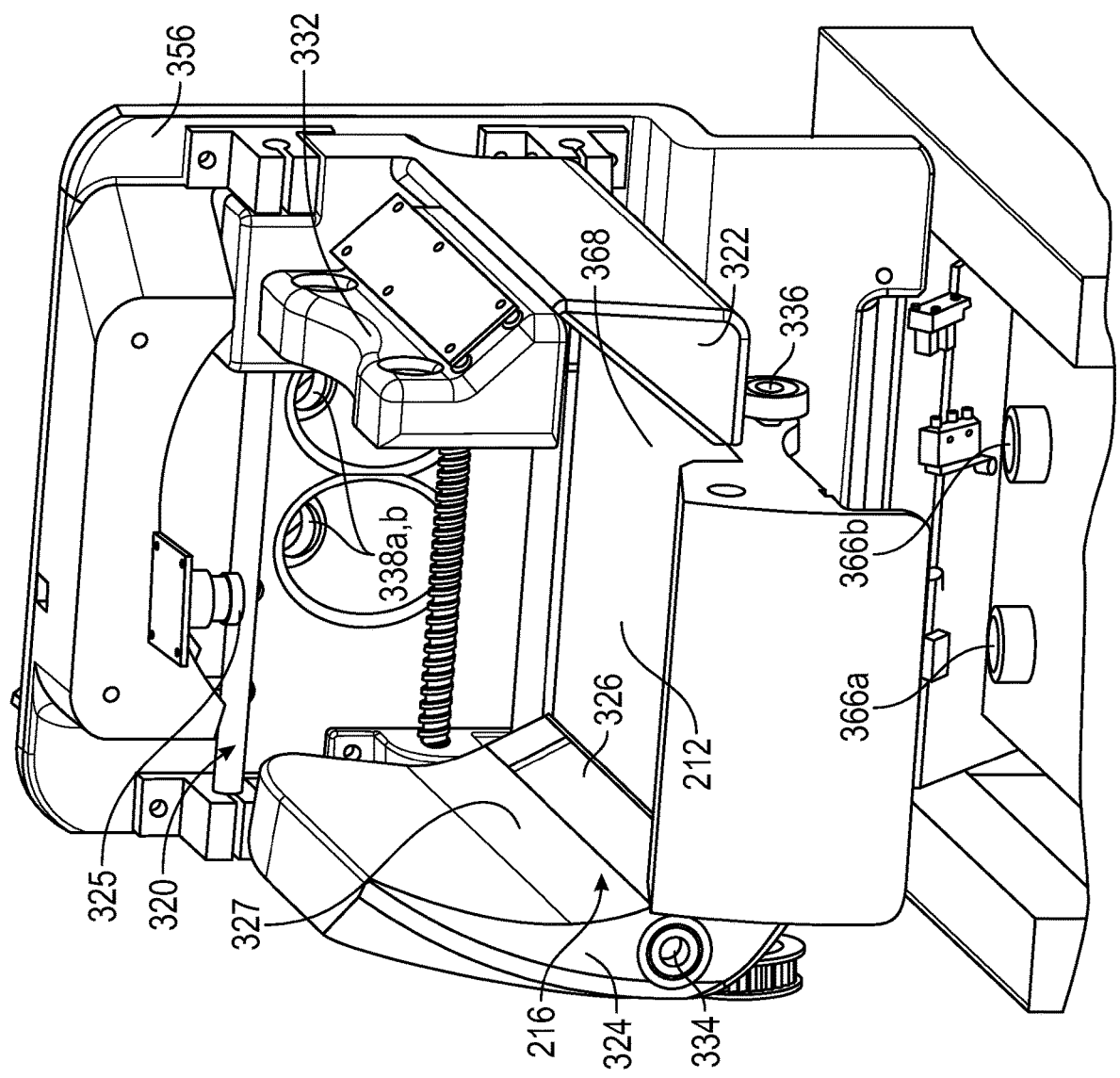
FIGS. 3A-3C are right front, left front, and left rear isometric views, respectively, of the inspection area of FIGS. 2A-2C with a housing and other exterior structures removed to better illustrate internal components associated with the inspection area.
Figure 3B:
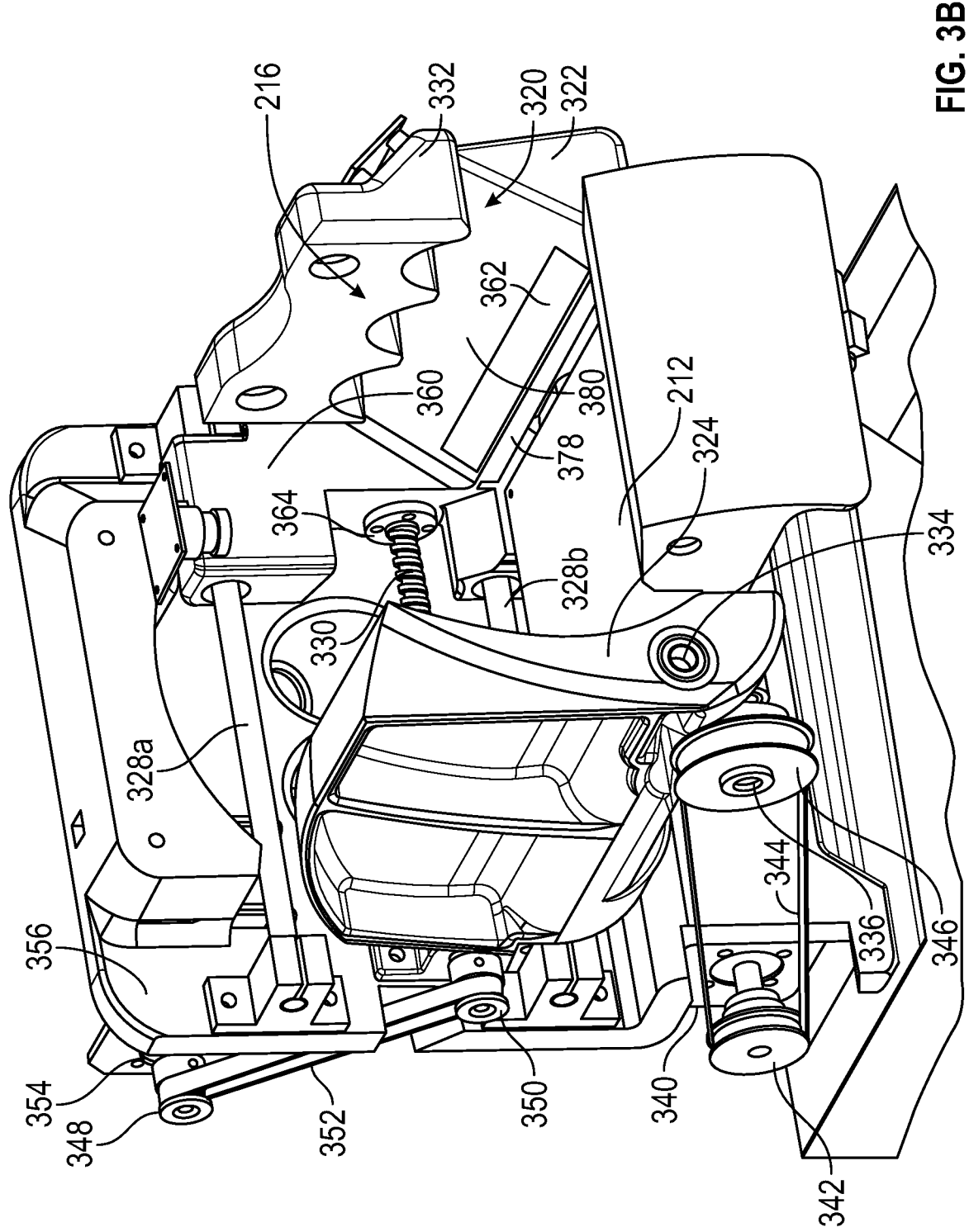
Figure 3C:
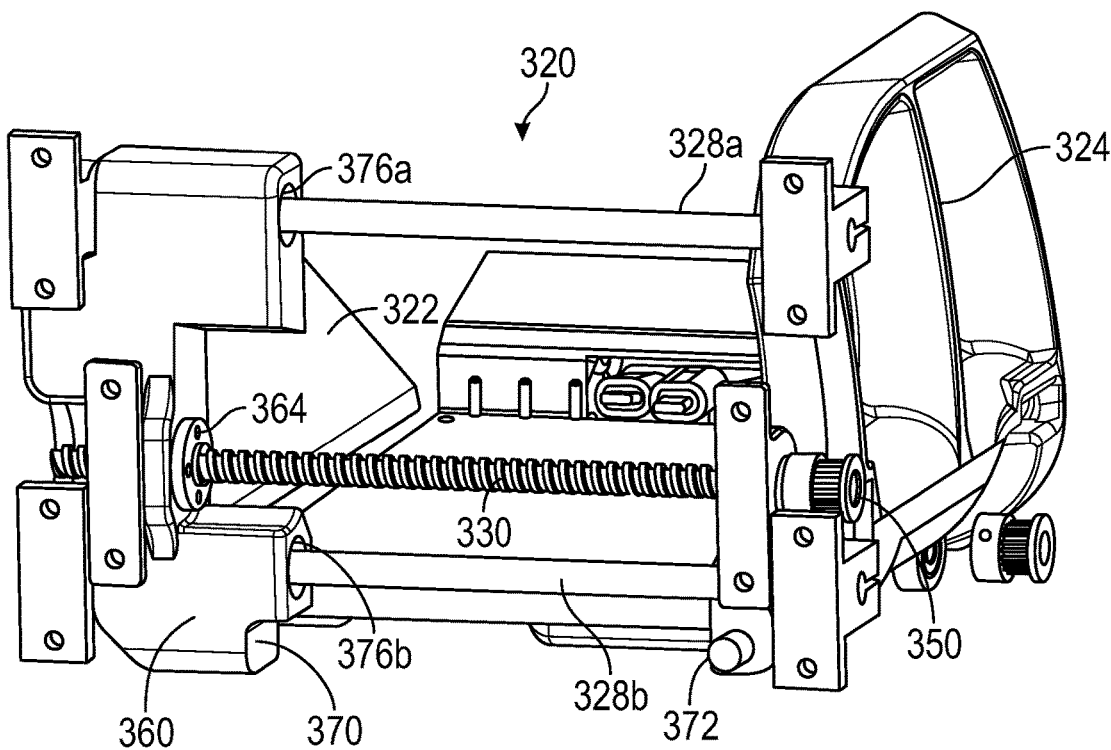
Figure 3D:
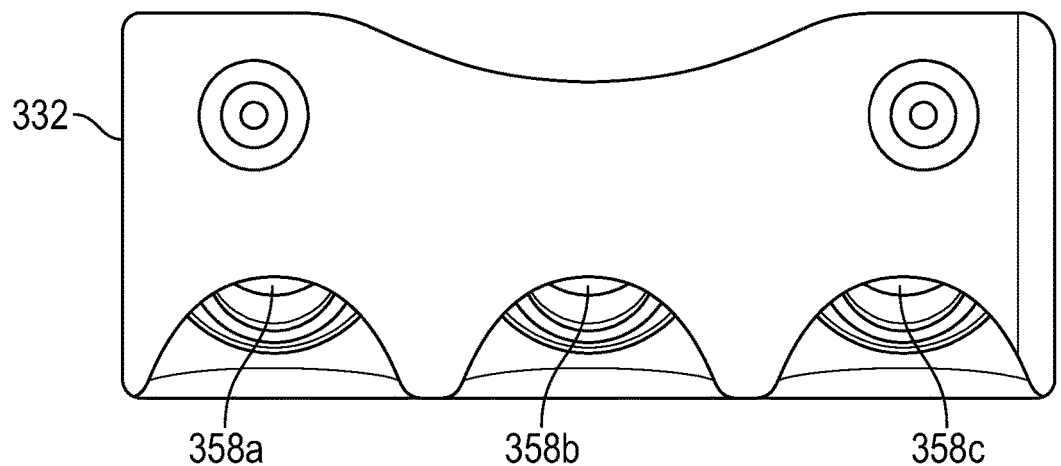
FIG. 3D is a front view of an inspection area light mount, configured in accordance with embodiments of the present technology.

FIGS. 3A-3C are right front, left front, and left rear isometric views, respectively, of the inspection area 216 with a number of external structures omitted to better illustrate certain operative components associated with the inspection area 216, and FIG. 3D is a front view of a light mount 332 that is used in the inspection area 216. Referring first to FIG. 3A, the inspection area 216 includes a camera 325 mounted above and directed downwardly toward the inspection tray 212. In some embodiments, the camera 325 can be configured to obtain still pictures and/or video images of mobile phones positioned on the inspection tray 212. In some embodiments, the camera 325 can include or be combined with one or more magnification tools, scanners, and/or other imaging components (e.g., other cameras) to view, photograph, and/or otherwise visually evaluate the mobile phone from multiple perspectives. Additionally, in some embodiments, the camera 325 can be movable to facilitate device visual inspection. In addition to the camera 325, the inspection area 216 can also include one or more lights directed toward the inspection tray 212 to facilitate the visual inspection of the mobile phone. For example, the inspection area can include a pair of lights 338a, b mounted in suitable bezels on a backplate 356. Similarly, as shown in FIG. 3D, the inspection area 216 can also include a plurality of lights 358a-c carried in suitable bezels on a light mount 332 that, as shown in FIG. 3A, is mounted generally above the pusher member 322 toward the right side of the inspection area 216.

As noted above, in some embodiments, the inspection tray 212 can be configured as a light table. For example, the inspection tray 212 (or at least an inspection surface portion 368 of the inspection tray 212 upon which the mobile phone is placed) can be made from a translucent (e.g., semitransparent) material, such as a translucent glass or plastic. In other embodiments, the inspection surface portion 368 can be made from a transparent material, such as transparent glass or plastic. By way of example only, in some embodiments the thickness of the inspection surface portion 368 (which can also be referred to as an inspection plate portion 368 and the like) can be from about 0.08 inch to about 0.25 inch, or about 0.12 inch. In such embodiments, the kiosk 100 can also include one or more lights 366a and 366b mounted to the kiosk chassis (or other adjacent kiosk structure) below the inspection area 216 and positioned to project light upwardly through the inspection tray 212 during visual inspection of, e.g., the mobile phone 210 (FIG. 2B). The lights 366a, b can include, for example, light emitting diodes (LEDs; such as white LEDs), fluorescent lights, incandescent lights, IR light, etc. Configuring the inspection tray 212 as a light table during visual evaluation of mobile phones can enhance the contrast and silhouette of the device as depicted in images of the device captured by the camera 325. This can facilitate more accurate evaluation of the size, shape, external features, etc. of the phone by the kiosk processor. Additionally, it is contemplated that in some embodiments the kiosk 100 can also include one or more UV light sources that can be positioned to project UV light on mobile phones in the inspection area 216 to clean the phones.

In the illustrated embodiment, the inspection area 216 further includes a pusher member 322 (which can also be referred to as a "member 322," "pusher 322," etc.) operably positioned toward a right side of the inspection tray 212, and a ramp member 324 (which can also be referred to as a "member 324," "ramp 324," etc.) operably positioned toward a left side of the inspection tray 212. As described in greater detail below, in operation the pusher member 322 and the ramp member 324 cooperate to flip a mobile phone placed on the inspection tray 212 over from one side to the other side, such as from an upward-facing position to a downward-facing position. The ramp member 324 is pivotally mounted to a chassis (or other adjacent mounting structure; not shown) by means of a pivot shaft 334. In the illustrated embodiment, the ramp member 324 includes a generally smooth, curved (e.g., radiused) concave surface 327 facing toward the pusher member 322. In other embodiments, the surface 327 can have other shapes and/or contours. For example, in some embodiments, the surface 327 and/or portions thereof can be flat, convex, etc. In some embodiments, a lower portion of the ramp member 324 can include a mirror 326 that enables the camera 325 to capture an image of the adjacent side of the mobile phone (not shown) positioned on the inspection tray 212. In the illustrated embodiment, the inspection tray 212 is pivotally mounted (via, e.g., bearings) to the chassis (or other adjacent support structure; not shown) by means of a pivot shaft 336 that is fixedly attached to the inspection tray 212 and enables the inspection tray 212 to pivot between the positions shown in FIGS. 2A-2C.

Turning next to FIG. 3B, a first pulley 346 is fixedly attached to a left end portion of the pivot shaft 336. The first pulley 346 is operably connected to a second pulley 342 by means of a drive belt 344 (e.g., a toothed rubber drive belt). The second pulley 342 is in turn fixedly attached to a drive shaft of a motor 340 (e.g., a stepper motor), which is mounted to a lower portion of the backplate 356. Accordingly, operation of the motor 340 (by, e.g., a kiosk controller; not shown) rotates the first pulley 346 by means of the second pulley 342 and the drive belt 344. Rotation of the first pulley 346 rotates the pivot shaft 336, which in turn rotates the inspection tray 212. In this manner, operation of the motor 340 can be used to rotate the inspection tray 212 between the three positions illustrated in FIGS. 2A-2C.

In the illustrated embodiment, the pusher member 322 includes a short vertical surface 378 extending upwardly adjacent to the upper surface of the inspection tray 212, and an angled surface 380 that extends upwardly and away from the vertical surface 378 at an angle. The pusher member 322 extends forwardly from a base 360. In some embodiments, the base 360 is slidably mounted on upper and lower guide shafts 328a and 328b, respectively. More specifically, in the illustrated embodiment, the base 360 includes two cylindrical bores 376a and 376b (FIG. 3C), and the guide shafts 328a, b can be cylindrical shafts that are slidably received in the corresponding bores 376a, b, respectively. The base 360 is movably coupled to a drive screw 330 by means of a threaded coupling 364 (e.g., a drive nut). An opposite end portion of the drive screw 330 is fixedly attached to a first pulley 350. As shown in FIG. 3B, the first pulley 350 is operably coupled to a second pulley 348 by means of a drive belt 352 (e.g., a toothed rubber drive belt). The second pulley 348 is fixedly attached to a drive shaft of an electric motor 354 (e.g., a stepper motor) that is mounted to the aft surface of the backplate 356. In operation, the kiosk controller (not shown) can operate the motor 354 to rotate the second pulley 348 and, in turn, drive the first pulley 350 to rotate the drive screw 330. Rotation of the drive screw 330 in a first direction causes the pusher member 322 to move across the inspection tray 212 on the guide shafts 328a, b toward the ramp member 324. Conversely, rotation of the drive screw 330 in the opposite direction causes the pusher member 322 to move away from the ramp member 324 and return to its starting position on the opposite side of the inspection tray 212.

As shown in FIG. 3C, the base 360 of the pusher member 322 includes a contact surface 370. In operation, as the pusher member 322 approaches the ramp member 324, the contact surface 370 contacts a contact feature 372 (e.g., a cylindrical pin) that extends rearwardly from a lower portion of the ramp member 324. As the pusher member 322 continues moving toward the ramp member 324 (i.e., from left to right in FIG. 3C), the contact surface 370 drives the contact feature 372 to the right, thereby causing the ramp member 324 to rotate counterclockwise about the pivot shaft 334 (FIG. 3B) as viewed from FIG. 3C, which is equivalent to rotating in the clockwise direction about the pivot shaft 334 in FIG. 3B. When the pusher member 322 moves away from the ramp member 324, a return spring (not shown) and/or another biasing member operably coupled to the ramp member 324 causes the ramp member 324 to rotate back to its original position.

Figure 4A:
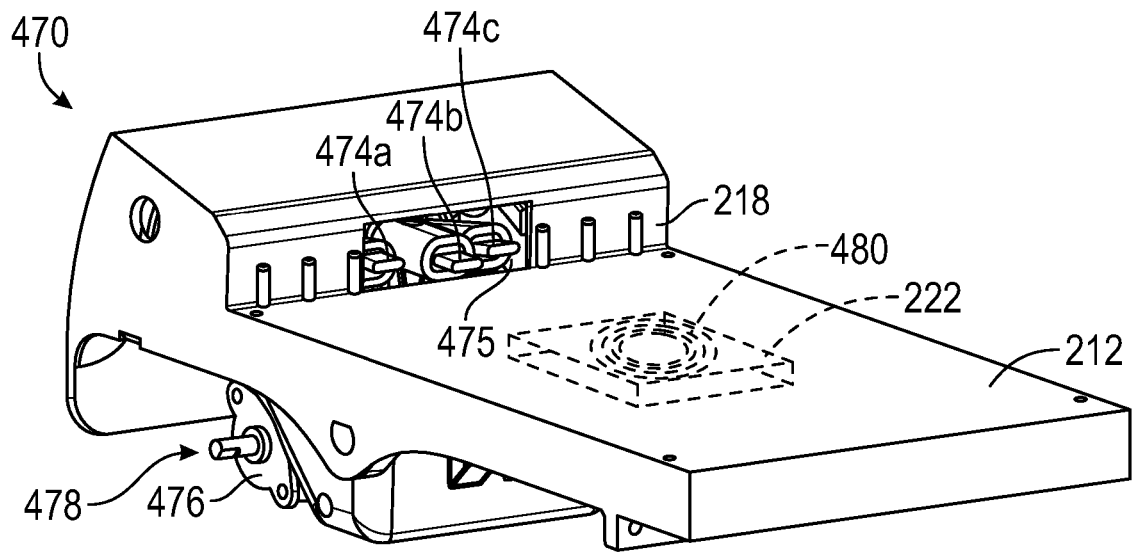
FIG. 4A is a right rear isometric view of a mobile device inspection tray assembly configured in accordance with embodiments of the present technology.

FIG. 4A is a right rear isometric view of an inspection tray assembly 470 configured in accordance with embodiments of the present technology. In the illustrated embodiment, the inspection tray assembly 470 includes the inspection tray 212 and an electrical connector carrier assembly 478 which is mounted to the underside of the inspection tray 212 and moves with the inspection tray 212 as it pivots between the three positions illustrated in FIGS. 2A-2C discussed above. The connector carrier assembly 478 includes an electric motor 476 (e.g., a stepper motor) operably coupled to a camshaft (not shown). The camshaft includes a plurality of lobes that are each operably positioned to move a corresponding one of a plurality of mobile device electrical connectors 474a-c (e.g., USB connectors, Android and iOS connectors, etc.) positioned in or near an opening 475 in the shelf 218 of the inspection tray 212. In operation, a kiosk controller (not shown) can activate the motor 476, which in turn rotates the camshaft so that one of the lobes selectively drives the desired electrical connector (e.g., 474b) outwardly through the opening 475, while the other electrical connectors (e.g., 474a and 474c) remain back in the opening 475. With the desired electrical connector 474 in this position, the user can easily connect their mobile phone to the correct connector when placing their mobile phone on the shelf 218 as illustrated above with reference to FIG. 2A. As shown in FIG. 4A, the camshaft configuration of the carrier assembly 478 enables the electrical connectors 474a-c to be compactly arranged on the inspection tray 212. In some embodiments, the correct electrical connector is selected based on the make and model of phone that the user has identified via the display screen 104 (FIG. 1) that they wish to sell. Once the mobile phone has been electrically inspected via the selected connector, the motor 476 can rotate the camshaft to drive the selected connector back through the opening to disengage the connector from the mobile phone. This enables the mobile phone to be flipped over as described in detail below.

As noted above with reference to FIG. 2A, in some embodiments the kiosk 100 includes a wireless charger 222 (e.g., a "Qi charger") mounted (via, e.g., a plurality of screws or other fasteners) to the backside of the inspection tray 212. The wireless charger 222 is positioned so that a charging pad 480 of the charger 222 is relatively close (e.g., within less than 1.6 inches) from mobile phones placed on the frontside (inspection surface) of the inspection tray 212 so that the phones can be effectively charged. In some embodiments, the wireless charger 222 can be a wireless charger provided by STMicroelectronics of Coppell, Texas, USA. In other embodiments, other wireless chargers can be used.

Figure 4B:
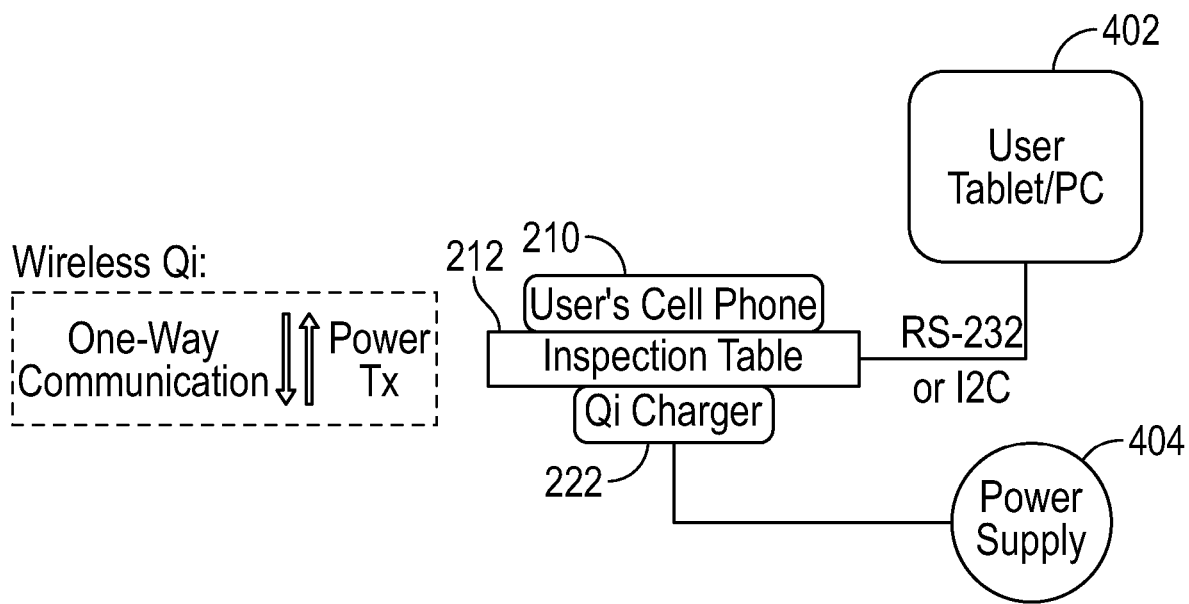
FIG. 4B is a schematic diagram illustrating a wireless charger mounted to the inspection tray assembly in accordance with embodiments of the present technology.

FIG. 4B is a schematic diagram illustrating a mounting arrangement of the wireless charger 222 configured in accordance with embodiments of the present technology. In the illustrated embodiment, the wireless charger 222 is electrically connected to a kiosk processor 402 (via, e.g., a serial port) and receives power from a kiosk power supply 404. In operation, when the charger 222 is powered on, it wirelessly provides power to the mobile phone 210, and the phone 210 responds by providing a one-way communication to the wireless charger 222. This communication can include specific information about the phone, including, for example, a Wireless Power ID packet that can provide the device manufacturer (e.g., Apple®, Samsung®, TI®, etc.), a unique identifier associated with the phone, such as a unique 32-bit identifier, etc. As described herein, the kiosk processor 402 can use this information to guide and facilitate the phone intake and/or purchasing transaction, as well as other useful purposes.

FIGS. 5A-5G are a series of front views of the inspection area 216 illustrating various stages of operation of the flipping apparatus 320 in accordance with embodiments of the present technology. In these Figures, a front portion of the inspection tray 212 has been omitted to better illustrate the operation of the flipping apparatus components. In the illustrated embodiment, the mobile phone 210 can have a front surface 585a (including, e.g., a display screen), a back surface 585b, a left side surface 586a (which can be referred to as a first side surface 586a) extending between the front surface 585a and the back surface 585b, and a right side surface 586b (which can be referred to as a second side surface 586b) extending between the front surface 585a and the back surface 585b opposite the first side surface 586a. The mobile phone 210 can also have a bottom side surface 587 (which can also be referred to as a third side surface 587) extending between the front surface 585a and the back surface 585b, and between the first side surface 586a and the second side surface 586b; and a top side surface (which can also be referred to as a fourth side surface; not shown in FIGS. 5A-5G) extending between the front surface 585a and the back surface 585b, and between the first side surface 586a and the second side surface 586b, opposite the third side surface 587. For ease of reference, the first side surface 586a and directly adjacent portions of the front surface 585a and the back surface 585b (and any corners or edges therebetween) can be collectively referred to herein as a left or first side portion 589a of the mobile phone 210, and the second side surface 586b and directly adjacent portions of the front surface 585a and the back surface 585b (and any corners or edges therebetween) can be collectively referred to herein as a right or second side portion 589b of the mobile phone 210. Similarly, the third side surface 587 and directly adjacent portions of the front surface 585a and the back surface 585b (and any corners or edges therebetween) can be collectively referred to herein as a bottom or third side portion 591 of the mobile phone 210, and the fourth side surface (not shown) and directly adjacent portions of the front surface 585a and the back surface 585b (and any corners or edges therebetween) can be collectively referred to herein as a fourth side portion.

Starting in FIG. 5A, the mobile phone 210 is positioned on the inspection tray 212 with the front surface 585a (e.g., the display screen) facing upwardly as shown by the arrow F. By way of example, this position can correspond to the mobile phone 210 undergoing electrical and visual inspection as shown in FIG. 2B. For example, the mobile phone 210 can undergo an electrical inspection and evaluation using the appropriate electrical connector 474a-c (FIG. 4A), and the front surface 585a of the mobile phone 210 can be visually inspected and evaluated via the camera 325 as described above. Additionally, the sides of the mobile phone 210 (e.g., the first side surface 586a and the second side surface 586b) can be evaluated via the camera 325 by use of one or more mirrors. For example, the mirror 326 (FIG. 3A) positioned on the lower portion of the ramp member 324 and proximate the inspection tray 212 can enable the camera 325 to obtain an image of the first side surface 586a of the mobile phone 210, and a mirror 362 (FIG. 3B) positioned toward a lower portion of the pusher member 322 and proximate the inspection tray 212 can enable the camera 325 to obtain an image of the second side surface 586b of the mobile phone 210. Once the mobile phone 210 has been electrically evaluated, the electrical connector 474 is disengaged from the mobile phone 210 as described above with reference to FIG. 4A. Once the electrical connector 474 has been disengaged and the front surface 585a and/or the side surfaces 586a, b of the mobile phone 210 have been visually evaluated and/or imaged as needed, the mobile phone 210 can be flipped (i.e., turned over) so that the back surface 585b of the mobile phone 210 can be visually inspected via the camera 325. In some embodiments, the inspection area 216 can include one mirror (e.g., the mirror 326 (FIG. 3A) or the mirror 362 (FIG. 3B)), and the one mirror can be used to obtain an image of a corresponding side surface of the mobile phone 210 (e.g., the first side surface 586a or the second side surface 586b) before the mobile phone 210 is flipped, and then the same one mirror can be used to obtain an image of the opposite side surface of the mobile phone 210 after the mobile phone 210 has been flipped.

Referring next to FIG. 5B, before beginning the flipping process, the camera 325 verifies that there is a mobile phone (or other electronic device) positioned on the inspection tray 212 and that the phone is not too large to flip. After confirming this, the flipping process begins by the pusher member 322 moving from right to left as shown by the arrow D1. As the pusher member 322 moves in this direction, the vertical surface 378 contacts at least a portion of the second side portion 589b of the mobile phone 210 and pushes the first side portion 589a against the lower portion of the curved surface 327 of the ramp member 324. This causes the first side portion 589a to slide upwardly against the curved surface 327, and the second side portion 586b to slide from right to left across the upper surface of the inspection tray 212. If at any point the mobile phone 210 becomes jammed (as indicated by, e.g., an over-current draw of the motor 354; FIG. 3B), the pusher member 322 reverses direction, returns to the starting position, and then the process repeats. If the mobile phone 210 cannot be flipped after a preset number of tries, the user can be informed via the display screen 104 (FIG. 1) and the phone can be returned to the user.

As shown in FIG. 5C, continued movement of the pusher member 322 from right to left as indicated by the arrow D2 causes the mobile phone 210 to move into an almost vertical orientation, leaning against the ramp member 324 with the second side portion 589b supported on the upper surface of the inspection tray 212. The reader will recall from the discussion of FIG. 3C above, that as the pusher member 322 continues moving into the left-most position shown in FIG. 5D, it interacts with the ramp member 324 (e.g., via the contact surface 370 and contact feature 372 shown in FIG. 3C) and causes the ramp member 324 to rotate clockwise about the pivot shaft 334 through an arc R1 as shown in FIG. 5D. In some embodiments, the arc can be from 5 degrees to about 25 degrees, or about 10 degrees. Rotating the ramp member 324 in this manner moves the mobile phone 210 past the over-center position, causing it to fall onto the angled surface 380 of the pusher member 322, as shown in FIG. 5E. In this position, the mobile phone 210 is laying on the angled surface 380 with the front surface 585a (e.g., the display screen) facing the angled surface 380.

Turning next to FIG. 5F, the ramp member 324 returns through an arc R2 to its original position as the pusher member 322 moves from left to right as indicated by the arrow D4. As the pusher member 322 moves to the right, the first side portion 589a of the mobile phone 210 slides downwardly along the angled surface 380 such that when the pusher member 322 arrives back in its original position, the mobile phone 210 is lying flat on the inspection tray 212 with the front surface 585a now pointing downwardly as indicated by the arrow F. In this position, the mobile phone 210 can be visually inspected by means of the camera 325 to determine whether, for example, there is any damage to the back surface 585b of the mobile phone. Such damage could include, for example, cracks, gouges, damage to the phone camera, etc. Additionally, as discussed above in reference to FIG. 2B, on some mobile phones the IMEI number is printed or otherwise formed on the back surface 585b of the mobile phone. In some embodiments, the kiosk 100 can visually inspect such phones (using, e.g., OCR) to read or otherwise obtain the IMEI number off the back surface 585b of the mobile phone once the phone has been flipped to the position shown in FIG. 5G. In some situations, the second side surface 586b of the mobile phone 210 may be positioned against, or otherwise too close, to the mirror 326 (FIG. 3A) at the lower portion of the ramp member 324 and, as a result, the camera 325 may not be able to obtain a satisfactory image of the second side surface 586b. For such situations, the kiosk can include one more vibrators 590 (e.g., an electromechanical vibrator) that, in response to a control signal from the kiosk processor 402, vibrates the inspection tray 212 to thereby cause the mobile phone 210 to move away from the mirror 326 so that the camera 325 can obtain a suitable image of the second side surface 586b. Additionally, in some embodiments, the inspection tray 212 may be positioned at a slight angle sloping downwardly away from the ramp member 324 to facilitate the foregoing movement of the phone 210 in response to vibration of the inspection tray 212.

FIGS. 6A-6C are a series of front views illustrating various stages of operation of a flipping apparatus 320a configured in accordance with another embodiment of the present technology. Many of the components and features of the flipping apparatus 320a are at least generally similar in structure and function to the flipping apparatus 320 described in detail above. In one aspect of this embodiment, however, the flipping apparatus 320a is configured to flip the mobile phone 210 over without requiring any "tipping" movement of the ramp member 324, such that the ramp member 324 can be fixed or otherwise stationary. For example, in some embodiments a portion of the upper surface of the inspection tray 212 may be curved or slanted upwardly toward the base of the ramp member 324, as illustrated by an angled surface portion 690 (which can also be referred to as a ramp feature 690). As shown in FIG. 6A, as the pusher member 322 moves from right to left, the first side portion 589a of the mobile phone 210 first slides up the ramp feature 690 and then up the curved surface 327 of the ramp member 324. As shown in FIG. 6B, as the pusher member 322 continues pushing the second side portion 589b of the mobile phone 210 to the left, the second side portion 589b moves up the ramp feature 690 and further into the recess formed by the concave curved surface 327. As a result, the mobile phone 210 is now in an over-center position, which causes the mobile phone 210 to fall to the right and onto the angled surface 380 of the pusher member 322, without any necessary "nudging" or pushing by the ramp member 324. As shown in FIG. 6C, as the pusher member 322 moves to the right toward its starting position, the side portions 589a and 589b of the mobile phone 210 slide down the angled surface 380 and the ramp feature 690, respectively, so that the mobile phone 210 is ultimately resting face down on the upper surface of the inspection tray 212. Accordingly, the embodiment described above with reference to FIGS. 6A-6C provides a method of flipping the mobile phone 210 without requiring the ramp member 324 to rotate or otherwise move.

While various embodiments of flipping apparatus have been described herein, it is contemplated that other flipping apparatuses configured in accordance with the present technology can also be provided to flip mobile phones and other mobile devices. For example, with reference to FIGS. 6A-6C, it is contemplated that the ramp member 324 could be configured with a concaved curved surface similar to the curved surface 327, but with an upper portion that extends further to the right in FIG. 6A relative to the base of the ramp member 324. By configuring the upper portion of the curved surface 327 to extend more in this direction, it is contemplated that mobile phones and other mobile devices can be moved to an over-center position using a pusher member at least generally similar to the pusher member 322 described above without the need for the ramp member 324 to move or otherwise impart any tipping action to the mobile phone 210.

Although the pusher member 322 is positioned to the right of the ramp member 324 in the illustrated embodiments of FIGS. 5A-6C, it will be understood that, in other embodiments, the relative positions can be reversed and the pusher member 322 can be positioned to the left of the ramp member 324. In some such embodiments, the structures and functions of the pusher member 322 and the ramp member 324 can be generally the same as, but the mirror image of, what is shown in FIGS. 5A-6C. Similarly, although in the embodiments of FIGS. 5A-6C, the mobile phone 210 is positioned so that the ramp member 324 and the pusher member 322 act against the respective first and second side portions 589a, b of the phone 210, in other embodiments, the mobile phone 210 can be positioned between the pusher member 322 and the ramp member 324 in other orientations. For example, in some embodiments, the mobile phone 210 can be rotated 90 degrees relative to the position shown in, e.g., FIG. 5A and positioned lengthwise between the pusher member 322 and the ramp member 324 so that the pusher member 322 and the ramp member 324 act against the third side portion 591 and the fourth side portion of the phone 210 to flip the phone over as described above. Accordingly, the present disclosure is not limited to any particular positional arrangement of the components of the flipping apparatus 320 and/or the mobile phone 210 unless the context clearly requires otherwise.

As described above, in some embodiments, the pusher member 322 translates across the upper surface of the inspection tray 212 to push the mobile phone 210 against the ramp member 324 while the ramp member remains stationary. In other embodiments, however, it is contemplated that the pusher member 322 can remain stationary (at least initially) and the ramp member 324 (or a suitable embodiment thereof) can translate across the upper surface of the inspection tray 212 to push the phone 210 against the pusher member 322 and cause the phone 210 to flip over as depicted in FIGS. 5A-5E. At this point, it may still be necessary to move the ramp member 322 as shown in FIGS. 5F and 5G to position the phone 210 in the final face-down position shown in FIG. 5F. In some embodiments, the flipping apparatus 320 described in detail above can be used to flip more than mobile phones and other handheld electronic devices. For example, in some embodiments the flipping apparatus 320 can be used to flip a user's identification card (e.g., a driver's license or other ID card). In these embodiments, the user would place their ID card face out on the inspection tray 212 when the tray is in the position shown in FIG. 2A, and then the inspection tray 212 would rotate back to the position shown in FIG. 2B. In this position, the inspection area camera 325 (see, e.g., FIG. 5A) would capture an image of the face (front side) of the ID card, and then the flipping apparatus 320 would flip the ID card over in the manner described above with reference to FIGS. 5A-5G so that the camera 325 can capture an image of the backside of the ID card. The images of the ID card can then be stored in a database and associated with a mobile phone the user sells. Additionally, the identification information can be read off the ID card image (via, e.g., OCR, etc.) and checked against a database of potentially fraudulent sellers as a means of fraud prevention. The images can also be transferred to a remote computer for display to a remote operator who can compare the information on the ID card (e.g., person's age, height, weight, etc.) to the images of the user obtained via the external camera 106 (FIG. 1) to verify the identity of the user. In such embodiments where the user's ID card or other form of identification is verified via the inspection area camera 325 as described above, the ID scanner 108 (FIG. 1) may not be necessary and could potentially be omitted.

Figure 7C:
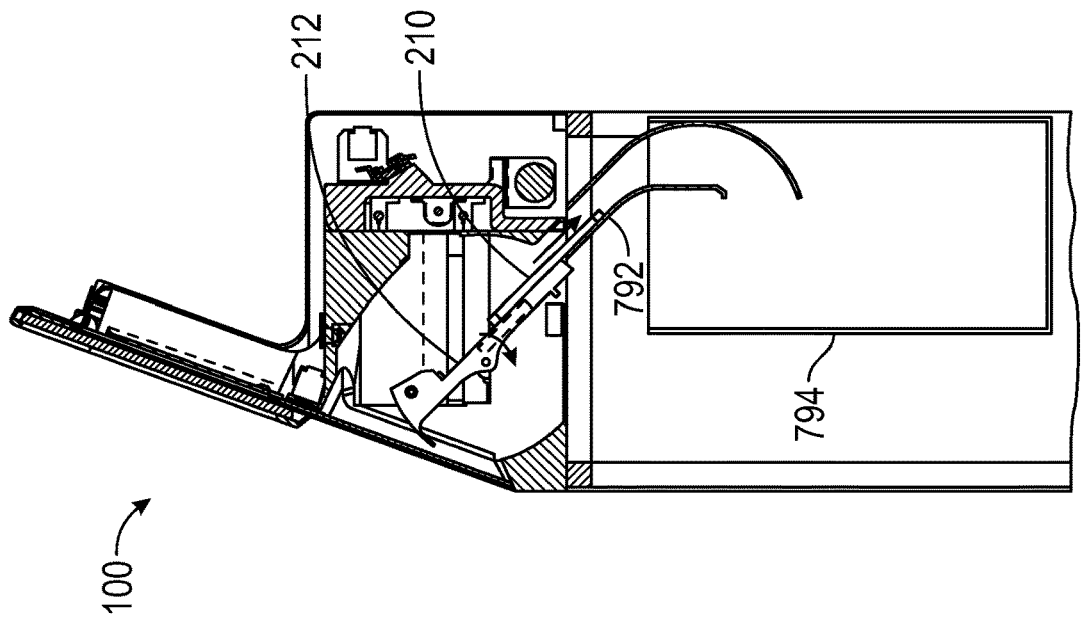
FIGS. 7A-7C are a series of cross-sectional side views of the kiosk of FIG. 1 illustrating three stages of operation of the inspection tray, in accordance with embodiments of the present technology.
Figure 7B:
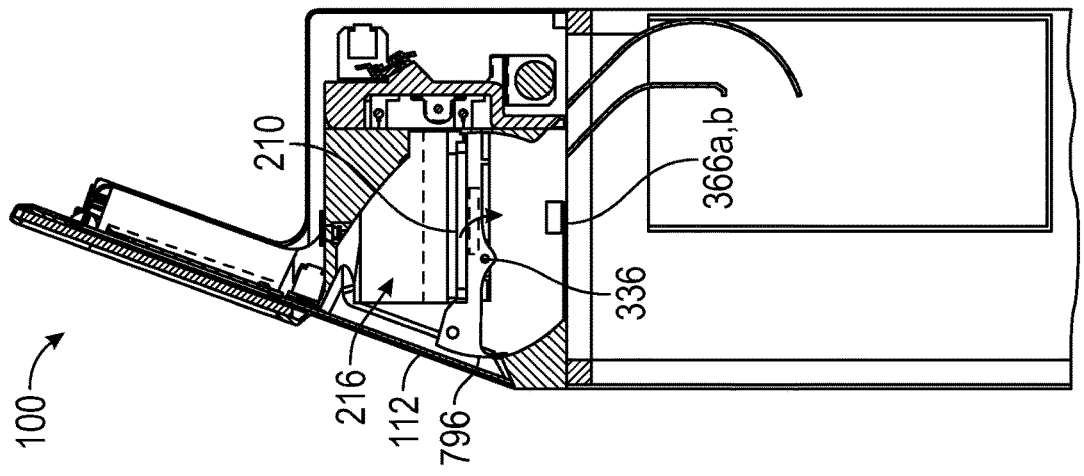
Figure 7A:
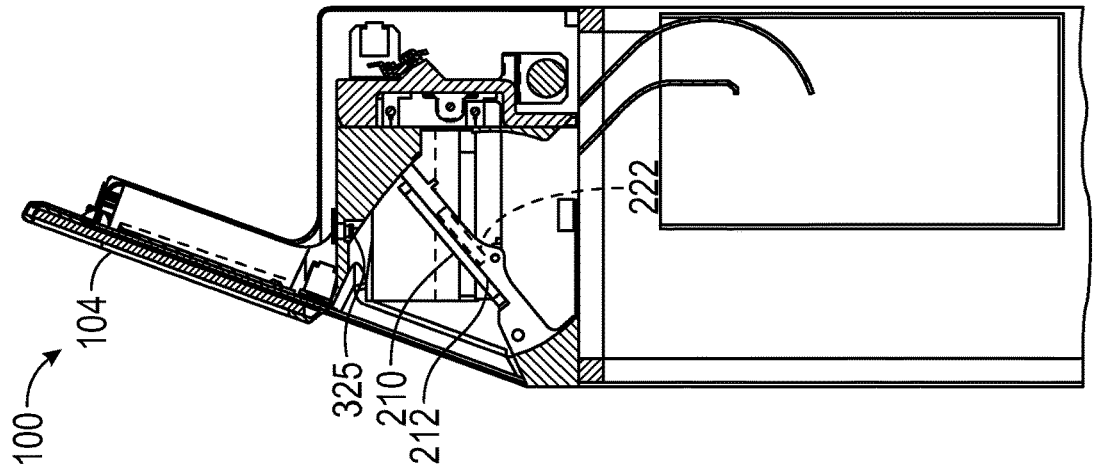

FIGS. 7A-7C are a series of cross-sectional side views of the kiosk 100 illustrating three stages of processing of a mobile device (e.g., the mobile phone 210) in accordance with embodiments of the present technology. As the reader will observe, FIGS. 7A-7C correspond to FIGS. 2A-2C, respectively, described above. Turning first to FIG. 7A, this view illustrates the mobile phone 210 positioned on the inspection tray 212 and engaged with the appropriate electrical connector 474 (FIG. 4A). In some embodiments, the wireless charger 222 can provide a quick charge to the mobile phone 210 if it is placed on the inspection tray 212 without power. Additionally (and even if the mobile phone 210 is charged when it is placed on the inspection tray 212), the mobile phone 210 responds to receiving power from the wireless charger 222 by providing information about the phone to the wireless charger 222. This information can be transmitted to the kiosk processor 402 (FIG. 4B) and can include a Wireless Power ID packet that can be used to determine, e.g., make, model, a unique 32-bit identifier associated with the phone, etc. The kiosk processor 402 can use this information to, for example, determine the appropriate electrical connector (e.g., a USB-C or Lightning connector) to present to the user on the inspection tray shelf 218. The phone identification information can also be used to determine the appropriate questions/prompts, etc. to display to the user via the display screen 104 for the phone inspection/purchase process. For example, if the mobile phone 210 is an Apple product, the display screen 104 can provide instructions for the user to log out of their iCloud account so that the phone can be purchased by the kiosk 100. Additionally, in some embodiments the unique phone identification information received from the mobile phone 210 via the wireless charger 222 can be used to track downstream processing of the mobile phone, thereby alleviating the need to have the user apply an identifying label or sticker (e.g., a barcode sticker) to the phone for tracking purposes.

With the mobile phone 210 in the position shown in FIG. 7A, the user can interact with the user interface on the kiosk display screen 104 (by, e.g., responding to prompts) and/or the user can also interact with the mobile phone 210 in response to prompts displayed on the display screen 104. By way of example, the user can interact with the mobile phone touchscreen display to bring up an "about" page using the phone's "settings" menu. The about page can display various types of information about the phone, which the kiosk 100 can capture via the camera 325 and process using, e.g., optical character recognition (OCR) software. Such information can include, for example, the model, serial number, operating system/operating system version, IMEI number, IP address, MAC addresses, carrier, memory configuration, user information, cloud lock status, etc. In some embodiments, this information can be used by the kiosk 100 to determine an estimated quote or a range of quotes (e.g., a high quote and a low quote) for the mobile phone 210 and present the estimated quote to the user. If the user is not interested in the estimated price and no longer wishes to proceed with the transaction, they can simply retrieve their mobile phone 210 from the kiosk 100. If the user decides to proceed with the transaction, the user may be asked to adhere a label with a unique code (e.g., a barcode) dispensed from the outlet 116 (FIG. 1) to the back of the mobile phone 210 for tracking purposes, and then place the phone back on the inspection tray 212.

Turning next to FIG. 7B, if the user decides to proceed with the transaction, the inspection area access door 112 closes and the inspection tray 212 rotates to the horizontal position. In this position, the mobile phone 210 can be electrically and/or visually inspected as described above. For example, as described above, in some embodiments, this includes a visual inspection of the front side of the mobile phone 210 followed by a visual inspection of the back side after the phone has been flipped using the flipping apparatus 320 described in detail above. As discussed above, the lights 366a, b can facilitate the visual inspection in those embodiments in which the inspection tray 212 is configured as a light table. Once the kiosk 100 has completed the electrical and visual inspection and evaluation of the mobile phone 210, the kiosk 100 determines whether the evaluation is sufficient to determine a price for the mobile phone 210. The determination can include, for example, whether the evaluation of the phone's type and condition is sufficient to determine a price to offer for the phone or whether the phone could be in a range of possible prices. For example, to determine a price for the mobile phone 210, the kiosk 100 may use information about the make and model of the phone or one or more unique identifiers of the phone to look up a current price for the device in a database or pricing model. The database or pricing model can be, for example, a local lookup table of common devices and/or a remotely hosted database or web service to which the kiosk 100 can transmit information about the electronic device and receive a current market value or offer price for the electronic device. After a purchase price has been determined, the user may be presented with the offer price via the display screen 104.

If the user accepts the offer price, the kiosk 100 can verify the user's identity and/or perform other fraud prevention measures as described above with reference to FIG. 2B. Once these steps have been satisfactorily completed, the inspection tray 212 rotates further aft as shown in FIG. 7C causing the mobile phone 210 to slide off of the aft portion of the inspection tray 212 and into a chute 792 leading to a storage bin 794. It will be noted that the forward portion of the inspection tray 212 includes a skirt 796 that blocks users from reaching under the inspection tray 212 and into the storage bin 794 when the access door 112 is open and the inspection tray 212 is in the position shown in FIG. 7B. Once the phone has been received in the bin 794, the kiosk 100 can provide payment of the purchase price to the user. In some embodiments, payment can be made in the form of cash dispensed from the payment outlet 110. In other embodiments, the user can receive remuneration for their mobile phone 210 in various other ways. For example, the user can be paid via a redeemable cash voucher, a coupon (e.g., a coupon for purchasing another mobile phone), an e-certificate, gift code, a prepaid card, etc. that is dispensed from the kiosk 100; or the kiosk 100 can implement payment via a gift code, redeemable voucher, coupon, e-certificate, etc., that is sent to the user via email, text, or other form of electronic message. Additionally, in some embodiments the kiosk 100 can implement payment to the user via a wired or wireless monetary deposit via the kiosk 100 to an electronic account (e.g., a bank account, a credit account, a loyalty account, an online commerce account, mobile wallet, etc.) via, e.g., PayPal, Venmo, etc., or with Bitcoin, etc.

In other embodiments, the price offered to the user for the mobile phone 210 can be a price quote or a range of price quotes. For example, in some embodiments the kiosk 100 can provide the user with a range of price quotes for the mobile phone 210, with the final price paid for the phone depending on the outcome of a subsequent evaluation of the mobile phone 210 by a human operator at a remote facility. The highest price quote may be based on the human inspection confirming that the phone 210 is in the same condition that was determined by the kiosk 100, whereas a lower price quote may be based on the human inspection determining that the phone 210 is in worse condition (e.g., more damaged) than was initially determined by the kiosk 100. In such embodiments, if the user wishes to proceed with the sales transaction based on the quoted price (or prices), the kiosk 100 receives the mobile phone 210 but user is not paid for the phone immediately by the kiosk 100. Instead, after the kiosk operator has retrieved the mobile phone 210 from the kiosk 100 and the phone has undergone a human inspection to confirm condition, then the user can be paid the final price based on condition (e.g., the high quote or the low quote) by, e.g., a mailed check, or by any number of different methods of electronic payment including, e.g., sending of an e-certificate, gift code, coupon, redeemable voucher, etc. via email, text or other form of electronic message, or via a wired or wireless monetary deposit to an electronic account (e.g., a bank account, a credit account, a loyalty account, an online commerce account, mobile wallet, etc.).

Although only one storage bin (i.e., the storage bin 794) is shown in FIGS. 7A-7C, in some embodiments the kiosk 100 can include two or more storage bins for storing mobile phones of different types and/or for storing phones that may require different types of post-receipt processing. For example, in some embodiments the storage bin 794 can be a first storage bin used to store mobile phones that will be collected from the kiosk and undergo a normal processing procedure for resale, and the kiosk 100 can include a second storage bin (not shown) that receives mobile phones that may require some type of special processing or evaluation. Placing phones this second type of phone in a second storage bin enables a human operator to quickly access such phones if needed for evaluation, reporting, etc. By way of example, to implement a second storage bin the chute 792 can include two outlet paths and a deflector (not shown) or similar device to direct mobile phones into the appropriate storage bin.

As those of ordinary skill in the art will appreciate, the foregoing processes are but some examples of ways in which the kiosk 100 can be used to purchase, recycle or otherwise process consumer electronic devices such as mobile phones. Additionally, it should be understood that the configuration of the kiosk 100 described above is but one example of a suitable mobile device evaluation, purchasing, and/or recycling system that can be used with embodiments of the present technology. Accordingly, other embodiments of the present technology can use other systems without departing from the present disclosure. Although the foregoing examples are described in the context of mobile phones, it should be understood that kiosk 100 and various embodiments thereof can also be used in a similar manner for recycling virtually any consumer electronic device, such as MP3 players, tablet computers, laptop computers, e-readers, PDAs, Google® Glass™ smartwatches, and other portable or wearable devices, as well as other relatively non-portable electronic devices such as desktop computers, printers, televisions, DVRs, devices for playing games, entertainment or other digital media on CDs, DVDs, Blu-ray, etc. Moreover, although the foregoing examples are described in the context of use by a consumer, the kiosk 100 in various embodiments thereof can similarly be used by others, such as a store clerk, to assist consumers in recycling, selling, exchanging, etc. their electronic devices.

Figure 8:
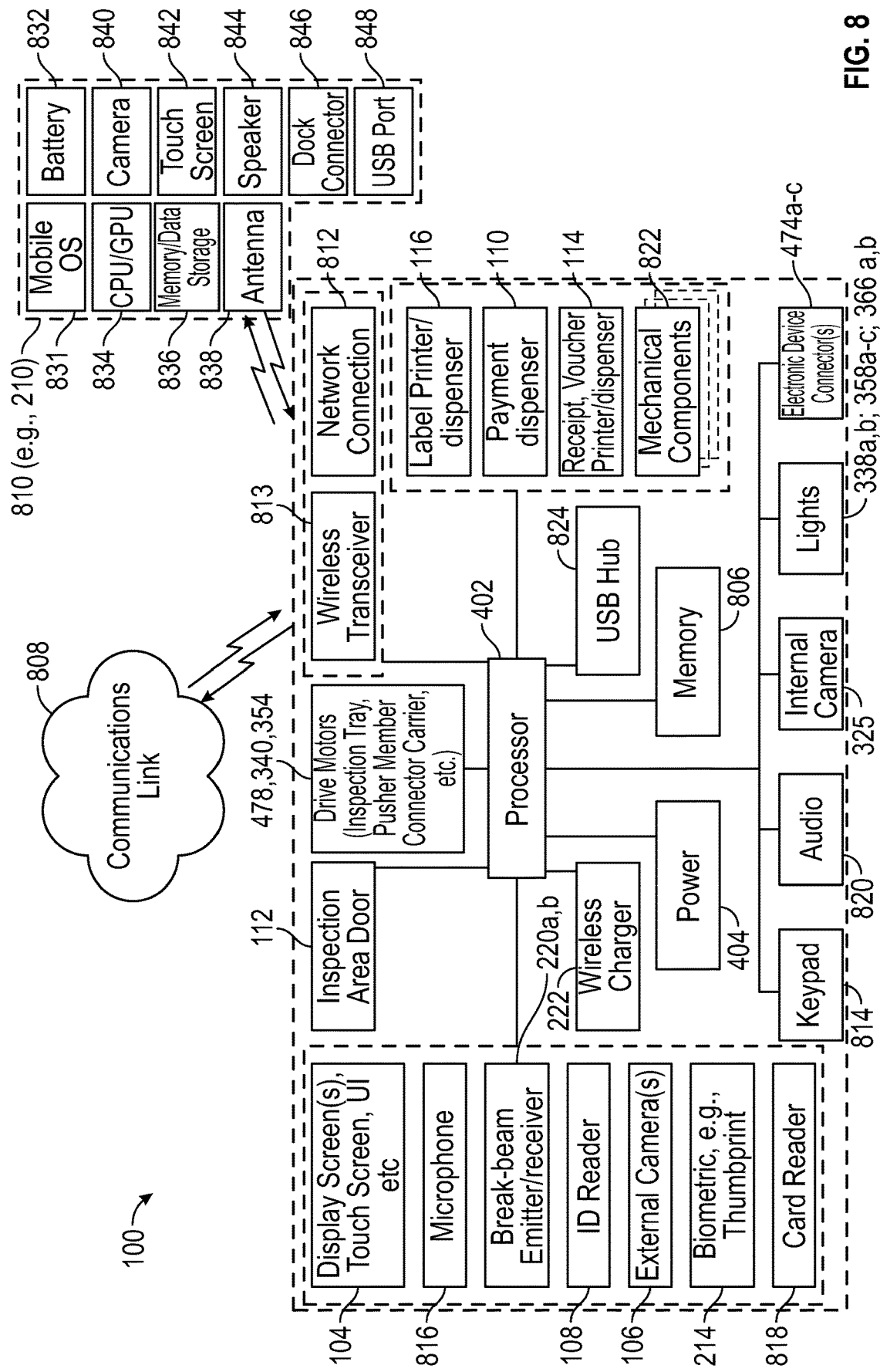
FIG. 8 is a schematic diagram illustrating various components associated with the kiosk of FIG. 1 configured in accordance with embodiments of the present technology.

FIG. 8 provides a schematic representation of an architecture of the kiosk 100 in accordance with embodiments of the present technology. In the illustrated embodiment, the kiosk 100 includes a suitable processor or central processing unit (CPU) 402 that controls operation of the kiosk 100 as described above in accordance with computer-readable instructions stored on system memory 806. The processor 402 may be any logic processing unit, such as one or more CPUs, digital signal processors (DSPs), application-specific integrated circuits (ASICs), etc. The processor 402 may be a single processing unit or multiple processing units in an electronic device or distributed across multiple devices. The processor 402 is connected to the memory 806 and may be coupled to other hardware devices and high-speed peripherals internally, for example, with the use of a bus (e.g., a USB 3.0 hub 824, a PCI Express or Serial ATA bus, etc.). The processor 402 can include, by way of example, a standard personal computer (PC) (e.g., a Dell® Optiplex® 7010PC; a Microsoft® Surface Pro® tablet, etc.); or other type of embedded computers running any suitable operating system, such as Windows® (e.g., Windows 8 Pro® operating system), Linux®, Android™, iOS®, or an embedded real-time operating system. In some embodiments, the processor 402 can be a small form factor PC with integrated hard disk drive (HDD) or solid-state drive (SSD) and universal serial bus (USB) or other ports to communicate with other components of the kiosk 100. In other embodiments, the processor 402 can include a microprocessor with a standalone motherboard that interfaces with a separate HDD. The memory 806 can include read-only memory (ROM) and random access memory (RAM) or other storage devices, such as disk drives or SSDs, that store the executable applications, test software, databases, and/or other software required to, for example, control kiosk components, process electronic device information and data (to, e.g., evaluate device make, model, condition, pricing, etc.), and communicate and exchange data and information with remote computers and other devices, etc. Program modules can be stored in the system memory 806, such as an operating system, one or more application programs, other programs or modules and program data. The memory 806 may also include a web browser for permitting kiosk 100 to access and exchange data with web sites over the Internet.

The processor 402 can provide information and instructions to kiosk users via the display screen 104 and/or an audio system (e.g., a speaker) 820. The processor 402 can also receive user inputs via, e.g., a touchscreen associated with the display screen 104 and/or, in some embodiments, a keypad 814 with physical keys, and/or a microphone 816. Additionally, the processor 402 can receive personal identification and/or biometric information associated with users via the ID reader 112 (e.g., a driver's license reader/scanner), one or more of the external cameras 106, and/or the fingerprint reader 214. In some embodiments, the processor 402 can also receive information (such as user identification and/or account information) via a card reader 818 (e.g., a debit, credit, or loyalty card reader having, e.g., a suitable magnetic stripe reader, optical reader, etc.). The processor 402 can also control operation of the label dispenser 116 and systems for providing remuneration to users, such as the payment (e.g., cash) dispenser 110 and/or a receipt or voucher printer and an associated dispenser 114.

The processor 402 can also control operation of the electronic, optical, and electromechanical systems the kiosk 100 includes for electrically, visually and/or physically analyzing electronic devices placed in the kiosk 100 for purchase or recycling. Such systems can include: one or more internal cameras (e.g., the camera 325) for visually inspecting electronic devices for, e.g., determining external dimensions and/or determining condition, such as whether and to what extent the LCD display of the mobile phone may be cracked; and the electrical connectors 474a-c (e.g., USB connectors) for, e.g., powering up mobile phones and other electronic devices and performing electronic inspections. The processor 402 can also be operably connected to the connector carrier 478 to control dispensing of the connectors 474a-c, and to the motors 340 and 354 to control movement of the inspection tray 212 and the pusher member 322, respectively, as described in detail above. The kiosk 100 further includes a plurality of mechanical components 822 that are electronically actuated for carrying out the various functions of the kiosk 100 during operation. The mechanical components 822 can include, for example, the inspection area access door 112 (FIG. 1A). The kiosk 100 further includes power 404, which can include battery power and/or facility power for operation of the various electrical components associated with kiosk operation.

In the illustrated embodiment, the kiosk 100 further includes a network connection 812 (e.g., a wired connection, such as an Ethernet port, cable modem, FireWire cable, Lightning connector, USB port, etc.) suitable for communication with, e.g., all manner of processing devices (including remote processing devices) via a communication link 808, and a wireless transceiver 813 (e.g., including a Wi-Fi access point; Bluetooth transceiver; near-field communication (NFC) device; wireless modem or cellular radio utilizing GSM, CDMA, 3G, 4G and/or 5G technologies; etc.) suitable for communication with, e.g., all manner of processing devices (including remote processing devices) via the communication link 808 and/or directly via, e.g., a wireless peer-to-peer connection. For example, the wireless transceiver 813 can facilitate wireless communication with electronic devices, such as a mobile device 810 (e.g., the mobile phone 210) for, e.g., wireless evaluation of the mobile device via, e.g., a mobile application loaded on the device. Such communication with the mobile device 810 can occur when the device is in the proximity of the kiosk 100 (e.g., in or near the inspection area 216) or when the device is remote from the kiosk. In other embodiments, the kiosk 100 can include other components and features that may be different from those described above, and/or one or more of the components and features described above may be omitted.

In the illustrated embodiment, the electronic device 810 is depicted as a handheld device, e.g., the mobile phone 210. In other embodiments, however, the electronic device 810 can be other types of electronic devices including, for example, other handheld devices; PDAs; MP3 players; tablet, notebook and laptop computers; e-readers; cameras; desktop computers; TVs; DVRs; game consoles; Google® Glass™; smartwatches; etc. By way of example only, in the illustrated embodiment the electronic device 810 can include one or more features, applications and/or other elements commonly found in smartphones and other known mobile devices. For example, the electronic device 810 can include a CPU and/or a graphics processing unit (GPU) 834 for executing computer readable instructions stored on memory 836. In addition, the electronic device 810 can include an internal power source or battery 832, a dock connector 846, a USB port 848, a camera 840, and/or well-known input devices, including, for example, a touchscreen 842, a keypad, etc. In many embodiments, the electronic device 810 can also include a speaker 844 for two-way communication and audio playback. In addition to the foregoing features, the electronic device 810 can include an operating system (OS) 831 and/or a device wireless transceiver that may include one or more antennas 838 for wirelessly communicating with, for example, other electronic devices, websites, and the kiosk 100. Such communication can be performed via, e.g., the communication link 808 (which can include the Internet, a public or private intranet, a local or extended Wi-Fi network, cell towers, the plain old telephone system (POTS), etc.), direct wireless communication, etc.

Figure 9:
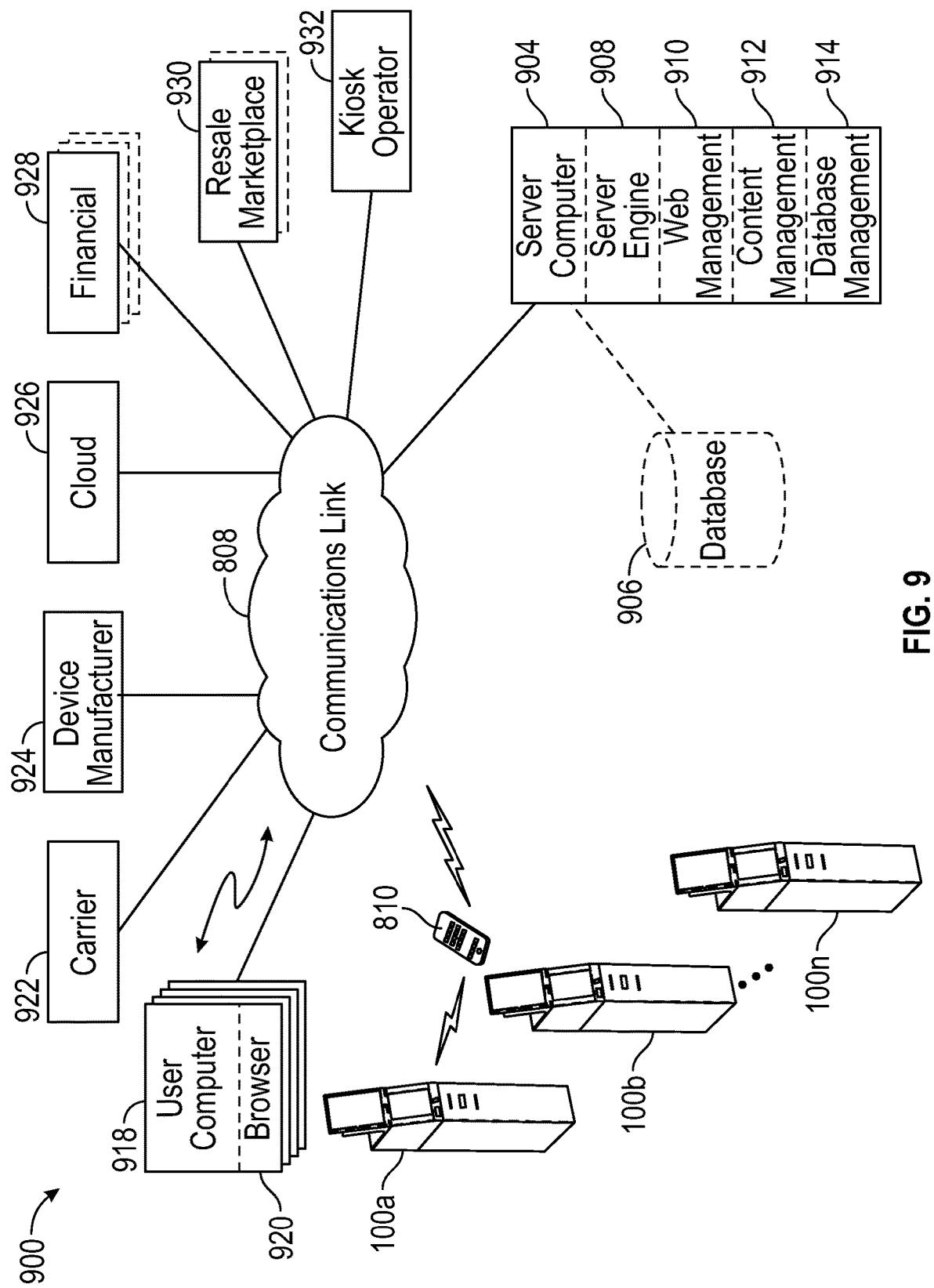
FIG. 9 is a schematic diagram of a suitable network environment for implementing various aspects of an electronic device recycling system configured in accordance with embodiments of the present technology.

FIG. 9 is a schematic diagram of a suitable network environment for implementing various aspects of an electronic device recycling system 900 configured in accordance with embodiments of the present technology. In the illustrated embodiment, a plurality of the kiosks 100 (identified individually as kiosks 100a-100n) can exchange information with one or more remote computers (e.g., one or more server computers 904) via the communication link 808. Although the communication link 808 can include a publicly available network (e.g., the Internet with a web interface), a private communication link, such as an intranet or other network can also be used. Moreover, in various embodiments the individual kiosks 100 can be connected to a host computer (not shown) that facilitates the exchange of information between the kiosks 100 and remote computers, other kiosks, mobile devices, etc.

The server computer 904 can perform many or all of the functions for receiving, routing and storing of electronic messages, such as webpages, audio signals and electronic images necessary to implement the various electronic transactions described herein. For example, the server computer 904 can retrieve and exchange web pages and other content with an associated database or databases 906. In some embodiments, the database 906 can include information related to mobile phones and/or other consumer electronic devices. Such information can include, for example, make, model, serial number, International Mobile Equipment Identity (IMEI) number, carrier plan information, pricing information, owner information, etc. In various embodiments the server computer 904 can also include a server engine 908, a web page management component 910, a content management component 912, and a database management component 914. The server engine 908 can perform the basic processing and operating system level tasks associated with the various technologies described herein. The webpage management component 910 can handle creation and/or display and/or routing of web or other display pages. The content management component 912 can handle many of the functions associated with the routines described herein. The database management component 914 can perform various storage, retrieval and query tasks associated with the database 906, and can store various information and data such as animation, graphics, visual and audio signals, etc.

In the illustrated embodiment, the kiosks 100 can also be operably connected to a plurality of other remote devices and systems via the communication link 808. For example, the kiosks 100 can be operably connected to a plurality of user devices 918 (e.g., personal computers, laptops, handheld devices, etc.) having associated browsers 920. Similarly, as described above the kiosks 100 can each include wireless communication facilities for exchanging digital information with wireless-enabled electronic devices, such as the electronic device 810 (e.g. the mobile phone 210). The kiosks 100 and/or the server computer 904 are also operably connectable to a series of remote computers for obtaining data and/or exchanging information with necessary service providers, financial institutions, device manufactures, authorities, government agencies, etc. For example, the kiosks 100 and the server computer 904 can be operably connected to one or more cell carriers 922, one or more device manufacturers 924 (e.g., mobile phone manufacturers), one or more electronic payment or financial institutions 928, one or more databases (e.g., the GSMA IMEI Database, etc.), and one or more computers and/or other remotely located or shared resources associated with cloud computing 926. The financial institutions 928 can include all manner of entity associated with conducting financial transactions, including banks, credit/debit card facilities, online commerce facilities, online payment systems, virtual cash systems, money transfer systems, etc.

In addition to the foregoing, the kiosks 100 and the server computer 904 can also be operably connected to a resale marketplace 930 and a kiosk operator 932. The resale marketplace 930 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 932 can be a central computer or system of computers for controlling all manner of operation of the network of kiosks 100. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 932 can further include one or more display screens operably connected to receive images from one or more cameras located at each of the kiosks 100 (e.g., one or more of the cameras 106 and 325). This remote viewing capability enables operator personnel to verify user identification and/or make other visual observations at the kiosks 100 in real-time during transactions. This can include remote evaluation of images of an electronic device, e.g., the mobile phone 210, by remote operator personnel to grade the physical condition of the device and/or to confirm that the kiosk's inspection of the device for make, model, condition, and/or purchase price was accurate. The images can include, e.g., images of the front side (including the display screen), the back side, the left/right lateral sides, the top side and/or the bottom side of the device. In some embodiments, for example, the kiosk 100 performs the visual and/or electrical inspection described above, and some or all of the results of the inspection are transmitted to the kiosk operator 932 via the communications link 808 along with images of the device. The kiosk operator 932 can then evaluate the images as described above and transmit a confirmation of the kiosk's estimated purchase price to the kiosk 100 or, if the remote evaluator disagrees with the estimated price, transmit a different price to the kiosk 100 to offer the user. In some embodiments, such remote evaluation of a device by remote personnel may only be conducted for certain mobile devices, such as those having estimated purchase prices above a preset amount.

The foregoing description of the electronic device recycling system 900 illustrates but one possible network system suitable for implementing the various technologies described herein. Accordingly, those of ordinary skill in the art will appreciate that other systems consistent with the present technology can omit one or more of the facilities described in reference to FIG. 9 or can include one or more additional facilities not described in detail in FIG. 9.

Although specific circuitry is described above, those of ordinary skill in the art will recognize that a microprocessor-based system could also be used where any logical decisions are configured in software. The foregoing discussions of FIGS. 8 and 9 provide a brief, general description of a suitable computing environment in which the present technology can be implemented. Although not required, aspects of the present technology are described in the general context of computer-executable instructions, such as routines executed by a general-purpose data processing device, e.g., a server computer, wireless device or personal computer. Those skilled in the relevant art will appreciate that aspects of the present technology can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Figure 10A:
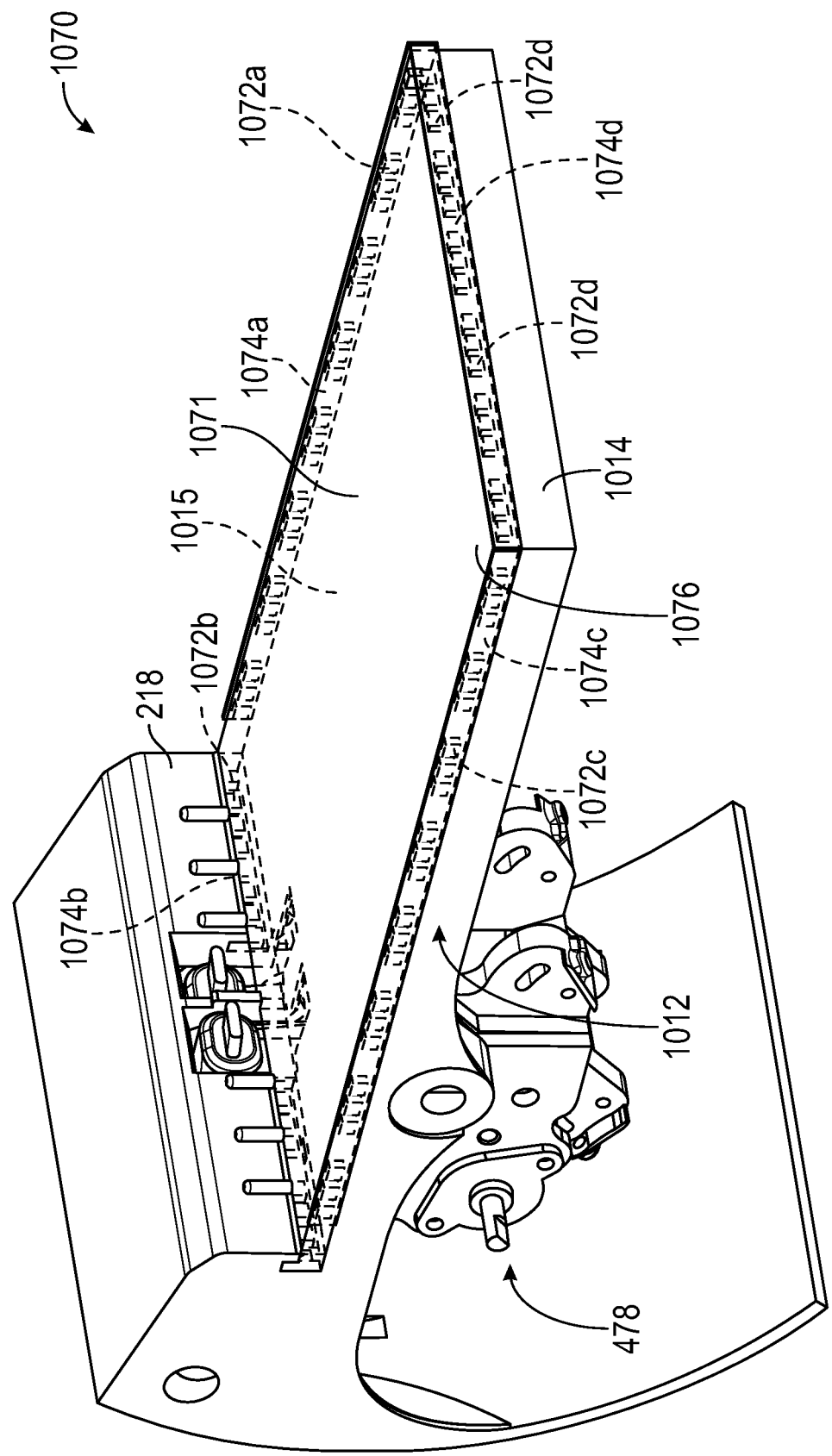
FIG. 10A is a right rear isometric view of a mobile device inspection tray assembly configured in accordance with embodiments of the present technology.
Figure 10B:
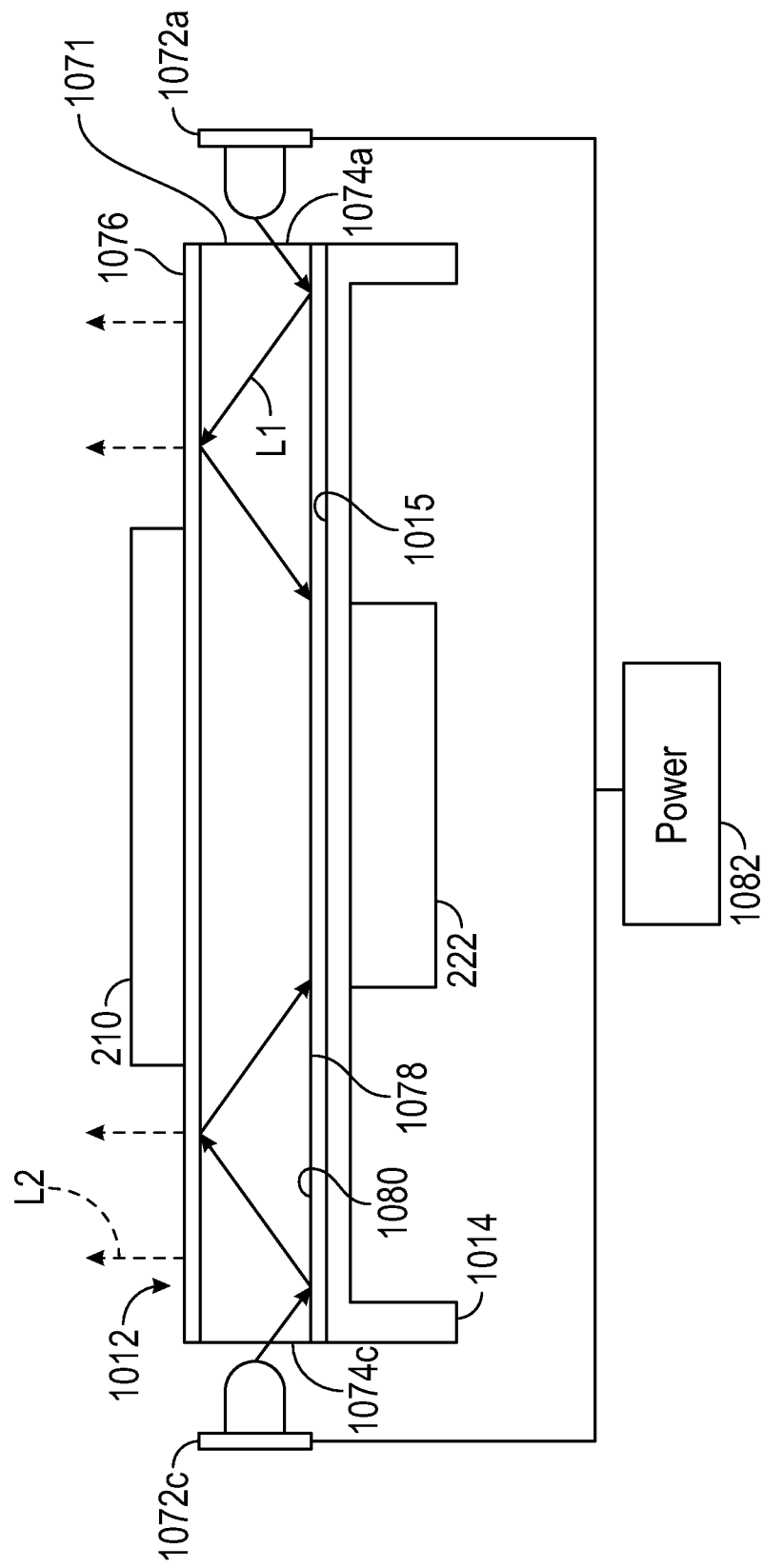
FIG. 10B is a partially schematic cross-sectional end view of the mobile device inspection tray assembly of FIG. 10A.

FIG. 10A is a right rear isometric view of a mobile device inspection tray assembly 1070 that can be used with the kiosk 100 and various embodiments thereof in place of the inspection tray assembly 470 described above with reference to FIGS. 4A and 4B, in accordance with embodiments of the present technology. FIG. 10B is a partially schematic cross-sectional end view of an inspection tray 1012 from the inspection tray assembly 1070 of FIG. 10A. Referring to FIGS. 10A and 10B together, the inspection tray assembly 1070 is at least generally similar in structure and function to the inspection tray assembly 470 described above. For example, in the illustrated embodiment, the inspection tray assembly 1070 includes an inspection tray 1012 that, except as noted below, is configured to move and otherwise operate in the same manner as the inspection tray 212 described above with reference to, e.g., FIGS. 2A-2C. Additionally, the connector carrier assembly 478 can be mounted to the underside of the inspection tray 1012 and configured to operate in the same manner, or at least generally the same manner, as described above with reference to FIG. 4A. In one aspect of the illustrated embodiment, however, the inspection tray 1012 includes an inspection plate 1071 mounted on an upper surface 1015 of an inspection tray base 1014. In some embodiments, the inspection tray base 1014 can have the same structural configuration, or at least approximately the same structural configuration, as the inspection tray 212 described above. The inspection plate 1071 can be attached or otherwise secured to the upper surface 1015 of the inspection tray base 1014 via, e.g., one or more mechanical fasteners, adhesives, and/or other suitable means.

In some embodiments, the inspection plate 1071 can be formed from a transparent material, such as glass, plastic, etc. In other embodiments, the inspection plate 1071 can be formed from a translucent or semi-transparent material, such as a translucent glass, plastic, etc. In some embodiments the inspection tray 1012 can further include one or more lights (e.g., one or more rows of lights) mounted to the inspection tray base 1012 and/or the inspection plate 1071 and operably positioned to project light inwardly through one or more lateral side surfaces 1074a-d of the inspection plate 1071. For example, in the illustrated embodiment, the inspection tray 1012 includes a plurality of lights 1072a-d (e.g., a plurality of light strips, such as LED light strips with a plurality of individual LED light sources) mounted to the respective side surfaces 1074a-d (e.g., the periphery) of the inspection plate 1071 and positioned to project light inwardly and at least partially through the inspection plate 1071. In other embodiments, one or more of the lights 1072a-d or embodiments thereof can be mounted to an adjacent structure in the inspection area 216 (FIGS. 2A-2C) so that the lights 1072a-d are positioned directly adjacent (or at least approximately adjacent) to one or more of the side surfaces 1074a-d as shown in FIG. 10B when the inspection tray 1012 is in, e.g., the horizontal position shown in FIG. 2B. As noted above, in some embodiments, the lights 1072a-d can include LEDs. In other embodiments, other types of light sources, such as fluorescent lights, incandescent lights, IR light, etc. can be used. In operation, the lights 1072a-d can receive power from a kiosk power source and/or a battery 1082, and can be configured to be illuminated only when needed for device evaluation (e.g., only when the inspection base structure 1012 is in the positions shown in FIGS. 2A and/or 2B). In other embodiments, the lights 1072a-d can be illuminated at all times that the kiosk 100 is operable and/or in use.

As shown in FIG. 10B, the inspection plate 1071 can have an upper surface 1076 configured to receive an electronic device, such as the mobile device 210. In some embodiments, the upper surface 1076 or a portion of the upper surface 1076 can be etched, or at least partially etched, frosted, and/or patterned, etc., (shown schematically in FIG. 10B) to reduce glare from the lights 1072a-d and/or to uniformly, or at least approximately uniformly, illuminate an object (e.g., the mobile phone 210) positioned on the upper surface 1076 of the inspection plate 1071. In some embodiments, the upper surface 1076 of the inspection plate 1071 can be etched via a chemical solution, sandblasting, and/or other suitable process or technique to form the, etching, frosting, and/or patterning, etc. In some embodiments, one or more portions of the upper surface 1076 can be untreated (e.g., not, etched, frosted, patterned, etc.). For example, in some embodiments, the upper surface 1076 can include one or more unetched features (e.g., circles or round areas, such as four round areas) positioned within a field of view of the camera 325 (FIGS. 3A and 3B), such that the camera 325 can be calibrated based at least in part on imaging the unetched features.

Referring to FIG. 10B in some embodiments, a bottom surface or bottom surface portion 1078 of the inspection plate 1071 can be covered by a reflective material 1080. The reflective material 1080 can be positioned at least partially between the inspection plate 1071 and the inspection tray base 1014 and configured to reflect light from the lights 1072a-d upwardly toward the upper surface 1076 as shown by arrows L1 in FIG. 10B. The light reflected by the reflective material 1080 can be incident on the upper surface 1076 and can help illuminate the mobile device 210, e.g., as shown by arrows L2 in FIG. 10B which, in some embodiments, can enhance the contrast and/or silhouette of the mobile device 210 as described previously. In some embodiments, the reflective material 1080 can be a sheet of white paper, a sheet of plastic, a thin sheet of metallic material, or any other suitable material. In some embodiments, the wireless charger 222 can be mounted to the underside of the inspection tray base 1014. In such embodiments, the reflective material 1080 can also be a non-conductive material, such that the reflective material 1080 does not reduce or prevent the mobile device 210 from interacting (e.g., charging, transmitting information, etc.) with the wireless charger 222. The lighted inspection plate 1071 and/or the inspection tray 1012 described herein are not limited to use with the kiosk 100 or limited to use as inspection surfaces that rotate. Indeed, in other embodiments, the inspection tray 1012 and/or the inspection plate 1071 can be configured to translate, remain stationary, etc. Moreover, although the inspection plate 1071 is mounted to the inspection tray base 1014 in the embodiments of FIGS. 10A and 10B, it is contemplated that, in other embodiments, the inspection plate 1071 and various embodiments thereof can be mounted to other support structures, or the inspection plate 1071 can be self-supporting. Further, although the inspection plate 1071 can be used in, for example, the kiosk 100 described above, it will be understood that the inspection plate 1071 and various embodiments thereof can also be used in virtually any type of mobile phone or electronic device recycling kiosk or other system to facilitate visual inspection of mobile phones and other devices. Examples of such other kiosks are described in, e.g., one or more of the patents and/or patent applications incorporated by reference herein. In some embodiments, for example, the inspection plate 1071 can be mounted to support structures that are configured to move or translate horizontally, vertically, diagonally, linearly, and/or curvilinearly, etc., or that are stationary or fixed.

The following patents and patent applications are incorporated herein by reference in their entireties: U.S. Pat. Nos. 10,860,990; 10,853,873; 10,572,946; 10,475,002; 10,445,708; 10,438,174; 10,417,615; 10,401,411; 10,269,110; 10,157,427; 10,127,647; 10,055,798; 9,885,672; 9,881,284; 8,200,533; 8,195,511; and 7,881,965; U.S. patent application Ser. Nos. 17/445,083, 17/445,082, 17/125,994, 16/794,009; 16/788,169; 16/788,153; 16/719,699; 16/794,009; 16/601,492; 16/575,090; 16/575,003; 16/556,104; 16/556,018; 16/534,741; 16/357,041; 16/195,785; 15/977,729; 15/901,526; 15/855,320; 15/672,157; 15/641,145; 15/630,460; 15/214,791; 15/091,487; 15/057,707; 14/967,183; 14/966,346; 14/964,963; 14/934,134; 14/663,331; 14/660,768; 14/598,469; 14/568,051; 14/498,763; 13/794,816; 13/794,814; 13/753,539; 13/733,984; 13/705,252; 13/693,032; 13/658,828; 13/658,825; 13/492,835; 13/113,497; and U.S. Provisional Application Nos. 63/220,890, 63/220,381, 63/127,148, 63/116,020; 63/116,007; 63/088,377; 63/070,207; 63/066,794; 62/950,075; 62/807,165; 62/807,153; 62/804,714; 62/782,947; 62/782,302; 62/332,736; 62/221,510; 62/202,330; 62/169,072; 62/091,426; 62/090,855; 62/076,437; 62/073,847; 62/073,840; 62/059,132; 62/059,129; 61/607,572; 61/607,548; 61/607,001; 61/606,997; 61/595,154; 61/593,358; 61/583,232; 61/570,309; 61/551,410; 61/472,611; 61/347,635; 61/183,510; and 61/102,304. All the patents and patent applications listed in the preceding sentence and any other patents or patent applications identified herein are incorporated herein by reference in their entireties.

Aspects of the invention can be embodied in a special purpose computer or data processor that is specifically programmed, configured, or constructed to perform one or more of the computer-executable instructions explained in detail herein. While aspects of the present technology, such as certain functions, are described as being performed exclusively on a single device, the present technology can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the present technology may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Reference throughout this specification to relative terms such as, for example, "generally," "approximately," and "about" are used herein to mean the stated value plus or minus 10%, unless the context clearly requires otherwise.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified, if necessary, to employ the systems, functions, and concepts of the various references described above to provide yet further implementations of the invention.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes are at times described as being performed in series, these processes may instead be performed or implemented in parallel or performed at different times.

The teachings of the present technology provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. An apparatus for moving an electronic device in a kiosk, the apparatus comprising:
    a support surface configured to support the electronic device in a first orientation facing a first direction;
    a pusher positioned toward a first side of the support surface, the pusher including a first contact feature; and
    a ramp positioned toward a second side of the support surface, opposite the first side, the ramp including a second contact feature, the ramp further including a proximal end portion positioned proximate the support surface and a distal end portion spaced apart from the support surface;
    wherein—
        the pusher is operable to contact a first side portion of the electronic device, push the electronic device across the support surface in a second direction toward the ramp, and drive a second side portion of the electronic device against the ramp and upwardly, away from the support surface; and
        the first contact feature is positioned to push against the second contact feature as the pusher moves toward the ramp, thereby causing the ramp to pivot about the proximal end portion of the ramp when the second side portion of the electronic device is positioned against the distal end portion of the ramp, and thereby moving the second side portion of the electronic device in a third direction, opposite the second direction, to rotate the electronic device toward a second orientation in which the electronic device faces a fourth direction, opposite the first direction.

2. The apparatus of claim 1 wherein the ramp includes a concave surface facing toward the pusher, and wherein the concave surface is configured to slidably contact the second side portion of the electronic device as the pusher drives the second side portion against the ramp and upwardly away from the support surface.

3. The apparatus of claim 1 wherein the pusher is further configured to move in the third direction after the ramp has moved the second side portion of the electronic device in the third direction, to thereby enable the electronic device to move into the second orientation on the support surface.

4. The apparatus of claim 1 wherein the pusher includes a vertical surface positioned proximate the support surface, and wherein the vertical surface is configured to contact the first side portion of the electronic device and push the electronic device in the second direction toward the ramp.

5. The apparatus of claim 4 wherein the pusher further includes an angled surface extending upwardly and away from the vertical surface at an angle, wherein the angled surface is configured to receive the electronic device when the electronic device is rotated toward the second orientation.

6. The apparatus of claim 5 wherein the pusher is further configured to move in the third direction after the angled surface receives the electronic device to thereby position the electronic device in the second orientation on the support surface.

7. The apparatus of claim 1 wherein the electronic device is a mobile phone.

8. The apparatus of claim 1 wherein the electronic device is a mobile phone, wherein the first side portion includes a first side surface of the mobile phone, and wherein the second side portion includes a second side surface of the mobile phone, opposite the first side surface.

9. The apparatus of claim 1 wherein the electronic device is a mobile phone, wherein the first side portion includes one of a bottom side surface or a top side surface of the mobile phone, and wherein the second side portion includes the other of the bottom side surface or the top side surface of the mobile phone.

10. The apparatus of claim 1 wherein the support surface is movable between an angled position and a horizontal position, wherein the support surface is configured to receive the electronic device when the support surface is in the angled position, and wherein the support surface is further configured to move from the angled position to the horizontal position to place the electronic device in the first orientation.

11. An apparatus for moving an electronic device in a kiosk for purchasing electronic devices, the apparatus comprising:
    a support surface configured to support the electronic device in a first orientation facing a first direction, wherein the support surface is movable between an angled position and a horizontal position, wherein the support surface is configured to receive the electronic device when the support surface is in the angled position, and wherein the support surface is further configured to move from the angled position to the horizontal position to place the electronic device in the first orientation;
    a movable pusher positioned toward a first side of the support surface; and
    a ramp positioned toward a second side of the support surface, opposite the first side, wherein the pusher is operable to contact a first side portion of the electronic device, push the electronic device across the support surface toward the ramp, and drive a second side portion of the electronic device against the ramp and upwardly into an over-center position from which the electronic device rotates toward a second orientation in which the electronic device faces a second direction, opposite the first direction.

12. The apparatus of claim 11 wherein the ramp includes a proximal end portion positioned proximate the support surface and a distal end portion spaced apart from the support surface, and wherein the ramp is configured to move the electronic device toward the second orientation when the second side portion of the electronic device is positioned against the distal end portion of the ramp.

13. The apparatus of claim 12 wherein the ramp is configured to pivot about the proximal end portion to move the electronic device toward the second orientation.

14. The apparatus of claim 13 wherein the pusher is configured to interact with the ramp as the pusher moves toward the ramp and thereby cause the ramp to pivot about the proximal end portion.

15. The apparatus of claim 13 wherein the pusher includes a first contact feature and the ramp includes a second contact feature, and wherein the first contact feature is positioned to push against the second contact feature as the pusher moves toward the ramp and thereby cause the ramp to pivot about the proximal end portion.

16. The apparatus of claim 11 wherein the ramp is stationary.

17. The apparatus of claim 11 wherein the ramp includes a concave surface facing toward the pusher, and wherein the concave surface is configured to slidably contact the second side portion of the electronic device as the pusher drives the second side portion against the ramp and upwardly into the over-center position.

18. The apparatus of claim 17 wherein the pusher is further configured to push the first side portion of the electronic device onto the ramp, and wherein the concave surface is further configured to slidably contact the first side portion and direct it upwardly and away from the support surface as the second side portion moves into the over-center position.

19. The apparatus of claim 11 wherein the support surface includes a horizontal portion and an angled surface portion, wherein the angled surface portion is positioned proximate the ramp and angled upwardly toward the ramp, and wherein the angled surface portion is configured to slidably receive the second side portion of the electronic device and direct the second side portion upwardly from the horizontal portion and toward the ramp.

20. A consumer operated kiosk for purchasing an electronic device from a user, the electronic device having a display screen, the kiosk comprising:
a housing;
an inspection area within the housing, wherein the inspection area includes—
an inspection tray configured to support the electronic device in a first position in which the display screen faces a first direction, wherein the inspection tray is movable between an angled position and a horizontal position, wherein the inspection tray is configured to receive the electronic device when the inspection tray is in the angled position, and wherein the inspection tray is further configured to move from the angled position to the horizontal position to place the electronic device in the first position;
a first member positioned on a first side of the inspection tray; and
a second member positioned on a second side of the inspection tray, opposite the first side; and
one or more processors operably connected to the first member, wherein the one or more processors are configured to execute computer readable instructions to—
cause the first member to move toward the second member and push the electronic device at least partially onto the second member and away from the inspection tray; and
cause the first member to move away from the second member to facilitate rotation of the electronic device to a second position in which the display screen faces a second direction, opposite the first direction.

21. The consumer operated kiosk of claim 20 wherein the electronic device is a mobile phone.

22. The consumer operated kiosk of claim 20 wherein the electronic device has a front side that includes the display screen and a back side opposite the front side, wherein the kiosk further comprises one or more cameras operably positioned in the inspection area and above the inspection tray—
wherein the one or more cameras are configured to obtain an image of the front side of the electronic device when the electronic device is in the first position, and
wherein the one or more cameras are further configured to obtain an image of the back side of the electronic device when the electronic device is in the second position.

23. The kiosk of claim 20 wherein the second member is a stationary member.

24. The kioisk of claim 20 wherein the second member includes a concave surface facing toward the first member, and wherein the electronic device is configured to slidably contact the concave surface as the first member pushes the electronic device at least partially onto the second member.

25. The kiosk of claim 20 wherein the second member includes a proximal end portion positioned proximate the inspection tray and a distal end portion spaced apart from the inspection tray, and wherein the second member is configured to direct the electronic device toward the second position when a portion of the electronic device is positioned against the distal end portion of the second member.

26. The kiosk of claim 25 wherein the one or more processors are operably connected to the first member and the second member, and wherein the one or more processors are further configured to execute the computer readable instructions to cause the second member to pivot about the proximal end portion to move the electronic device toward the second position.

27. A consumer operated kiosk for purchasing an electronic device from a user, the electronic device having a front side that includes a display screen and a back side opposite the front side, the kiosk comprising:
a housing;
an inspection area within the housing, wherein the inspection area includes—
an inspection tray configured to support the electronic device in a first position in which the display screen faces a first direction;
a first member positioned on a first side of the inspection tray, wherein the first member includes a first minor positioned proximate the inspection tray; and
a second member positioned on a second side of the inspection tray, opposite the first side, wherein the second member includes a second minor positioned proximate the inspection tray;
one or more processors operably connected to the first member, wherein the one or more processors are configured to execute computer readable instructions to—
cause the first member to move toward the second member and push the electronic device at least partially onto the second member and away from the inspection tray; and
cause the first member to move away from the second member to facilitate rotation of the electronic device to a second position in which the display screen faces a second direction, opposite the first direction; and
one or more cameras operably positioned in the inspection area and above the inspection tray, wherein the one or more cameras are configured to— obtain an image of the front side of the electronic device when the electronic device is in the first position, obtain an image of the back side of the electronic device when the electronic device is in the second position, obtain, via the first minor, an image of a first side surface of the electronic device, and obtain, via the second mirror, an image of a second side surface of the electronic device, opposite the first side surface.

28. The consumer operated kiosk of claim 27 wherein the first side surface is one of a right side surface or a left side surface, and the second side surface is the other of the right side surface or the left side surface.

29. A consumer operated kiosk for purchasing an electronic device from a user, the electronic device having a display screen, the kiosk comprising:
a housing;
an inspection area within the housing, wherein the inspection area includes—
an inspection tray configured to support the electronic device in a first position in which the display screen faces a first direction;
a first member positioned on a first side of the inspection tray; and
a second member positioned on a second side of the inspection tray, opposite the first side;
a vibrator operably coupled to the inspection tray; and
one or more processors operably connected to the first member and the vibrator, wherein the one or more processors are configured to execute computer readable instructions to—
cause the first member to move toward the second member and push the electronic device at least partially onto the second member and away from the inspection tray;
cause the first member to move away from the second member to facilitate rotation of the electronic device to a second position in which the display screen faces a second direction, opposite the first direction; and
selectively activate the vibrator to vibrate the inspection tray and move the electronic device toward the first member.

30. A method for operating a kiosk, the method comprising:
receiving an electronic device on an inspection tray, wherein the inspection tray is movable between an angled position and a horizontal position, wherein the inspection tray receives the electronic device when the inspection tray is in the angled position;
moving the inspection tray from the angled position to the horizontal position to place the electronic device in an inspection area of the kiosk, wherein the electronic device is supported in a first horizontal orientation in which a display of the electronic device faces a first direction;
moving a first member of a flipping apparatus against a first side portion of the electronic device to push the electronic device toward a second member of the flipping apparatus and drive a second side portion of the electronic device upwardly against the second member, to thereby rotate the electronic device away from the first horizontal orientation and toward a vertical orientation; and
moving the first member away from the second member to thereby enable further rotation of the electronic device to a second horizontal orientation in which the display faces a second direction, opposite the first direction.

31. The method of claim 30, further comprising, after moving the first member against the first side portion of the electronic device, rotating the second member to push the second side portion of the electronic device toward the first member and rotate the electronic device toward the second horizontal orientation.

32. The method of claim 30 wherein moving the first member against the first side portion of the electronic device includes moving the first member toward the second member, and wherein the method further comprises, in response to moving the first member toward the second member, pivoting the second member toward the first member to rotate the electronic device about the first side portion.

33. The method of claim 30 wherein driving the second side portion of the electronic device upwardly against the second member includes moving the second side portion of the electronic device against a curved surface of the second member.

34. The method of claim 30, further comprising:
before moving the first member against the first side portion of the electronic device, obtaining, via one or more cameras positioned in the inspection area, a first image of the electronic device in the first horizontal orientation; and
after moving the first member away from the second member, obtaining, via the one or more cameras, a second image of the electronic device in the second horizontal orientation.

35. The method of claim 34 wherein obtaining the first image includes obtaining an image of the display of the electronic device.

36. A kiosk for purchasing an electronic device from a user, the electronic device having a front side that includes a display screen and a back side opposite the front side, the kiosk comprising:
a housing; and
an inspection area within the housing, wherein the inspection area includes—
a support surface configured to receive the electronic device in a first orientation in which the front side faces a first direction relative to the support surface, wherein the support surface is movable between an angled position and a horizontal position, wherein the support surface is configured to receive the electronic device when the support surface is in the angled position, and wherein the support surface is further configured to move from the angled position to the horizontal position to place the electronic device in the inspection area;
one or more cameras operably positioned in the inspection area and above the support surface; and
a flipping apparatus configured to turn the electronic device over from the first orientation to a second orientation in which the front side faces a second direction, opposite the first direction, relative to the support surface,
wherein the one or more cameras are configured to obtain an image of the electronic device when the electronic device is in the first orientation, and
wherein the one or more cameras are further configured to obtain an image of the electronic device when the electronic device is in the second orientation.

37. The kiosk of claim 36 wherein the first direction is away from the support surface and the second direction is toward the support surface, wherein the one or more cameras are configured to obtain an image of the front side of the electronic device when the electronic device is in the first orientation, and wherein the one or more cameras are further configured to obtain an image of the back side of the electronic device when the electronic device is in the second orientation.

38. The kiosk of claim 36 wherein the flipping apparatus includes—
- a first member positioned toward a first side of the support surface; and
- a second member positioned toward a second side of the support surface, opposite the first side, wherein the first member is configured to push the electronic device across the support surface and against the second member, and wherein the second member is configured to move the electronic device into an over-center position from which the electronic device rotates toward the second orientation.

\* \* \* \* \*

UNITED STATES PATENT AND TRADEMARK OFFICE
CERTIFICATE OF CORRECTION

| | |
|---|---|
| PATENT NO. | : 12,033,454 B2 |
| APPLICATION NO. | : 17/445158 |
| DATED | : July 9, 2024 |
| INVENTOR(S) | : Babak Forutanpour et al. |

It is certified that error appears in the above-identified patent and that said Letters Patent is hereby corrected as shown below:

On the Title Page

On the page 3, in Column 1, item (56) under "U.S. Patent Documents", Line 10, delete "Homung et al." and insert -- Hornung et al. --.
On the page 8, in Column 2, item (56) under "Other Publications", Line 40, delete "recylcing,"" and insert -- recycling," --.
On the page 9, in Column 1, item (56) under "Other Publications", Line 36, delete "Jiuh-Bling" and insert -- Jiuh-Biing --.

In the Specification

In Column 26, Line 21, delete "10B" and insert -- 10B, --.

In the Claims

In Column 32, Line 18, delete "kioisk" and insert -- kiosk --.

Signed and Sealed this
Fifteenth Day of April, 2025

Coke Morgan Stewart
*Acting Director of the United States Patent and Trademark Office*